(12) United States Patent
Spielman et al.

(10) Patent No.: US 12,442,646 B1
(45) Date of Patent: Oct. 14, 2025

(54) TRANSPORTATION ROUTE PLANNING AND GENERATION

(71) Applicant: Lyft, Inc., San Francisco, CA (US)

(72) Inventors: Charles Parker Spielman, San Francisco, CA (US); Mayank Gulati, San Francisco, CA (US); Karina Goot, San Francisco, CA (US); Priyanka Madhav Phatak, San Francisco, CA (US); Michael Francis Lodick, San Francisco, CA (US); Jatin Chopra, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 187 days.

(21) Appl. No.: 18/348,735

(22) Filed: Jul. 7, 2023

Related U.S. Application Data

(63) Continuation of application No. 17/648,148, filed on Jan. 17, 2022, now Pat. No. 11,703,336, which is a continuation of application No. 16/595,394, filed on Oct. 7, 2019, now Pat. No. 11,226,208.

(51) Int. Cl.
*G01C 21/34* (2006.01)

(52) U.S. Cl.
CPC ..... *G01C 21/3423* (2013.01); *G01C 21/3469* (2013.01); *G01C 21/3484* (2013.01)

(58) Field of Classification Search
CPC ............ G01C 21/3423; G01C 21/3469; G01C 21/3484
See application file for complete search history.

(56) References Cited

U.S. PATENT DOCUMENTS

| | | | |
|---|---|---|---|
| 6,208,934 B1 | 3/2001 | Bechtolsheim et al. |
| 8,489,641 B1 | 7/2013 | Seefeld et al. |
| 9,057,612 B1 | 6/2015 | Savvopoulos |
| 9,679,487 B1 | 6/2017 | Hayward |
| 9,689,693 B2 | 6/2017 | Newlin et al. |
| 9,713,963 B2 | 7/2017 | Liu et al. |

(Continued)

FOREIGN PATENT DOCUMENTS

| | | |
|---|---|---|
| CN | 107240168 A | 10/2017 |
| CN | 107289958 A | 10/2017 |

(Continued)

OTHER PUBLICATIONS

Search Report and Rule 62 EPC as received in European application 20875579.3 dated Oct. 10, 2023.

(Continued)

*Primary Examiner* — Alan D Hutchinson
(74) *Attorney, Agent, or Firm* — Keller Preece PLLC

(57) ABSTRACT

Methods and systems for planning and creating transportation routes with multiple modalities are provided. In one embodiment, a method is provided that includes receiving a transportation request that includes a first location and a second location. A transportation proposal may then be generated including a route for transportation between the first location and the second location. The method may then include determining modalities available to provide transportation and determining respective transportation segments for the modalities, and at least a subset of the transportation segments may be combined to form the route for transportation. The transportation proposal, including the route for transportation, may then be transmitted for display on a mobile device.

20 Claims, 14 Drawing Sheets

(56) References Cited

U.S. PATENT DOCUMENTS

| | | |
|---|---|---|
| 9,752,890 B2 | 9/2017 | Meisels et al. |
| 10,248,120 B1 | 4/2019 | Siegel et al. |
| 10,248,913 B1 | 4/2019 | Gururajan |
| 10,249,120 B2 | 4/2019 | Ahearn et al. |
| 10,331,727 B2 | 6/2019 | Naghdy et al. |
| 10,371,539 B2 | 8/2019 | Broyles et al. |
| 10,408,624 B2 | 9/2019 | Salowitz et al. |
| 10,419,878 B1 | 9/2019 | Sanchez et al. |
| 10,545,026 B1 | 1/2020 | Schaefer |
| 10,594,806 B2 | 3/2020 | Ishikawa et al. |
| 10,636,109 B2 | 4/2020 | Bonanni, III et al. |
| 10,648,822 B2 | 5/2020 | Newlin et al. |
| 10,746,555 B1 | 8/2020 | Spielman et al. |
| 10,914,600 B1 | 2/2021 | Spielman et al. |
| 11,100,346 B2 | 8/2021 | Beaurepaire |
| 11,226,208 B2 | 1/2022 | Spielman et al. |
| 11,473,924 B2 | 10/2022 | Spielman et al. |
| 11,703,336 B2 | 7/2023 | Spielman et al. |
| 11,733,049 B2 | 8/2023 | Spielman et al. |
| 2002/0161520 A1 | 10/2002 | Dutta et al. |
| 2005/0187707 A1 | 8/2005 | Yokota et al. |
| 2005/0251331 A1 | 11/2005 | Kreft |
| 2007/0073562 A1 | 3/2007 | Brice et al. |
| 2008/0208443 A1 | 8/2008 | Massie et al. |
| 2008/0248815 A1 | 10/2008 | Busch |
| 2009/0177387 A1 | 7/2009 | Liu |
| 2009/0271109 A1 | 10/2009 | Lee et al. |
| 2009/0319163 A1 | 12/2009 | Sutter et al. |
| 2011/0040479 A1 | 2/2011 | Uyama et al. |
| 2012/0010816 A1 | 1/2012 | Uyama et al. |
| 2012/0173134 A1 | 7/2012 | Gutman |
| 2012/0173135 A1 | 7/2012 | Gutman |
| 2013/0016012 A1 | 1/2013 | Beauregard |
| 2013/0073323 A1 | 3/2013 | Zacharia |
| 2013/0253833 A1 | 9/2013 | Tuukkanen |
| 2014/0005941 A1 | 1/2014 | Paek et al. |
| 2014/0006215 A1 | 1/2014 | Hornthal et al. |
| 2014/0052714 A1 | 2/2014 | Brodziak et al. |
| 2014/0351037 A1 | 11/2014 | Shaam et al. |
| 2014/0365113 A1 | 12/2014 | McGavran et al. |
| 2015/0032366 A1 | 1/2015 | Man et al. |
| 2015/0081418 A1 | 3/2015 | Sahai |
| 2015/0160028 A1 | 6/2015 | Burrows et al. |
| 2015/0187107 A1 | 7/2015 | Vander Mey et al. |
| 2015/0253143 A1 | 9/2015 | Bailiang et al. |
| 2016/0031506 A1 | 2/2016 | Lloyd et al. |
| 2016/0076905 A1 | 3/2016 | Broadbent et al. |
| 2016/0138925 A1 | 5/2016 | Takahashi |
| 2016/0203422 A1 | 7/2016 | Demarchi et al. |
| 2016/0298977 A1 | 10/2016 | Newlin et al. |
| 2016/0320194 A1 | 11/2016 | Liu et al. |
| 2016/0356603 A1 | 12/2016 | Hajj et al. |
| 2016/0358471 A1 | 12/2016 | Hajj et al. |
| 2016/0371800 A1 | 12/2016 | Kirshenboim |
| 2017/0074669 A1 | 3/2017 | Newlin et al. |
| 2017/0123618 A1 | 5/2017 | Porcella |
| 2017/0153113 A1 | 6/2017 | Gotoh et al. |
| 2017/0169366 A1 | 6/2017 | Klein et al. |
| 2017/0178268 A1 | 6/2017 | Ishikawa et al. |
| 2017/0185271 A1 | 6/2017 | Manoharan et al. |
| 2017/0191841 A1 | 7/2017 | Marueli et al. |
| 2017/0213273 A1 | 7/2017 | Dietrich et al. |
| 2017/0268891 A1 | 9/2017 | Dyrnaes et al. |
| 2017/0330111 A1 | 11/2017 | Vogel et al. |
| 2017/0357914 A1 | 12/2017 | Tulabandhula et al. |
| 2017/0358113 A1 | 12/2017 | Bray et al. |
| 2017/0359695 A1 | 12/2017 | Aerts |
| 2017/0370735 A1 | 12/2017 | Salowitz |
| 2018/0051995 A1 | 2/2018 | Delling et al. |
| 2018/0052002 A1 | 2/2018 | Delling et al. |
| 2018/0060778 A1 | 3/2018 | Guo et al. |
| 2018/0091604 A1 | 3/2018 | Yamashita et al. |
| 2018/0113914 A1 | 4/2018 | Mehedy et al. |
| 2018/0135989 A1 | 5/2018 | Schreier et al. |
| 2018/0156623 A1 | 6/2018 | West et al. |
| 2018/0204252 A1 | 7/2018 | Boulard et al. |
| 2018/0211337 A1 | 7/2018 | Ghaddar et al. |
| 2018/0244288 A1 | 8/2018 | Glaser et al. |
| 2018/0341880 A1 | 11/2018 | Kislovskiy et al. |
| 2018/0341881 A1 | 11/2018 | Kislovskiy et al. |
| 2018/0341887 A1 | 11/2018 | Kislovskiy et al. |
| 2018/0341888 A1 | 11/2018 | Kislovskiy et al. |
| 2018/0341895 A1 | 11/2018 | Kislovskiy et al. |
| 2018/0342033 A1 | 11/2018 | Kislovskiy et al. |
| 2018/0342034 A1 | 11/2018 | Kislovskiy et al. |
| 2018/0342113 A1 | 11/2018 | Kislovskiy et al. |
| 2018/0374032 A1 | 12/2018 | Pan et al. |
| 2019/0017839 A1 | 1/2019 | Eyler et al. |
| 2019/0046112 A1 | 2/2019 | Blanchard et al. |
| 2019/0056233 A1 | 2/2019 | Liu et al. |
| 2019/0101401 A1 | 4/2019 | Balva |
| 2019/0122315 A1 | 4/2019 | Valverde, Jr. et al. |
| 2019/0146500 A1 | 5/2019 | Yalla |
| 2019/0182626 A1 | 6/2019 | Miller et al. |
| 2019/0219411 A1 | 7/2019 | Christen et al. |
| 2019/0236743 A1 | 8/2019 | Bonanni, III et al. |
| 2019/0251503 A1 | 8/2019 | Simpson |
| 2019/0251509 A1 | 8/2019 | Simpson |
| 2019/0259272 A1 | 8/2019 | Nakamura |
| 2019/0272589 A1 | 9/2019 | Simpson |
| 2019/0277642 A1 | 9/2019 | Schmelzer et al. |
| 2019/0301891 A1 | 10/2019 | Rowitch |
| 2019/0318309 A1 | 10/2019 | Vaideeswaran et al. |
| 2019/0318443 A1 | 10/2019 | Goldman-Shenhar |
| 2019/0318818 A1 | 10/2019 | Chaudhuri et al. |
| 2019/0327579 A1 | 10/2019 | Rankin et al. |
| 2019/0339087 A1 | 11/2019 | Jindal et al. |
| 2019/0340928 A1 | 11/2019 | Goldman et al. |
| 2019/0370924 A1 | 12/2019 | Kassner et al. |
| 2019/0371472 A1 | 12/2019 | Blanchard et al. |
| 2019/0375301 A1 | 12/2019 | Whitt et al. |
| 2019/0383623 A1 | 12/2019 | Aich et al. |
| 2020/0041291 A1 | 2/2020 | Dunnette |
| 2020/0051192 A1 | 2/2020 | Didier et al. |
| 2020/0104761 A1 | 4/2020 | Aich et al. |
| 2020/0104962 A1 | 4/2020 | Aich et al. |
| 2020/0109956 A1 | 4/2020 | Nakamura et al. |
| 2020/0117204 A1 | 4/2020 | Lindemann et al. |
| 2020/0134765 A1 | 4/2020 | Majima et al. |
| 2020/0191587 A1 | 6/2020 | Fuchs |
| 2020/0300645 A1 | 9/2020 | Schirano |
| 2020/0378771 A1 | 12/2020 | Beaurepaire |
| 2020/0410375 A1 | 12/2020 | Seagraves et al. |
| 2021/0065114 A1 | 3/2021 | Thompson et al. |
| 2021/0293557 A1 | 9/2021 | Vigild et al. |

FOREIGN PATENT DOCUMENTS

| | | |
|---|---|---|
| CN | 108898241 A | 11/2018 |
| CN | 110648267 A | 1/2020 |
| WO | 2015140954 A1 | 9/2015 |
| WO | 2018/219337 A1 | 12/2018 |

OTHER PUBLICATIONS

U.S. Appl. No. 16/836,141, Aug. 31, 2023, Office Action.

Examination Report as received in Australian application 2020361447 dated Apr. 22, 2022.

Office Action as received in European application 20875579.3 dated May 13, 2022.

Office Action as received in Mexican application MX/a/2022/004182 dated Jun. 13, 2022 [No English translation available].

International Search Report and Written Opinion for App. No. PCT/US20/46673 dated Nov. 9, 2020 (8 pages).

Lee, Misuk et al., An Analysis of Destination Choice for Opaque Airline Products Using Multi-dimensional Binary Logit Models, Transportation Research, Part A, 46 (2012) (http://dx.doi.orgil0.1016/j.tra.2012.08.009.

Wagner et al.; Public Transit Routing with Unrestricted Walking; 17th Workshop on Algorithmic Approaches for Transportation Modelling, Optimization, and Systems (ATMOS 2017); http://illwww.iti.kit.edu/PublicTransitData/Switzerland!, retrieved Feb. 17, 2020; (14 pages).

(56) References Cited

OTHER PUBLICATIONS

Pajor, Thomas; Algorithm Engineering for Realistic Journey Planning in Transportation Networks; Nov. 15, 2013 (278 pages).
Delling et al.; Customizable Route Planning; Microsoft Research Silicon Valley, Karlsruhe Institute of Technology; retrieved Feb. 17, 2020; (12 pages).
Delling et al.; Computing Multimodal Journeys in Practice; Microsoft Research Silicon Valley; Karlsruhe Institute of Technology; retrieved Feb. 17, 2020; (12 pages).
Delling et al.; Computing and Evaluating Multimodal Journeys; Microsoft Research Silicon Valley; Karlsruhe Institute Df Technology; retrieved Feb. 17, 2020; (17 pages).
Baum et al,; UnLimited TRAnsfers for Multi-Modal Route Planning: An Efficient Solution; Karlsruhe Institute of Technology; Jul. 4, 2019 (18 pages).
Hoek et al.; osrm-backendiprofilesibicyde.lua; https://github.com/Project-OSRM/osrm-backendiblob/masteriprofiles/bicycle.lua; Dec. 1, 2019; retrieved Feb. 17, 2020; (15 pages).
Nguyen, Huyen Chau; Engineering Multimodal Transit Route Planning; Karlsruhe institute of Technology; Department of Informatics Institute of Theoretical Computer Science; Oct. 31, 2017; (64 pages).
Kirchler, Dominik; Efficient routing on multi-modal transportation networks; Ecole Polytechnique X; Oct. 28, 2013; (148 pages).
Dibbelt, Julian Matthias; Engineering Algorithms for Route Planning in Multimodal Transportation Networks; Karlsruhe Institute of Technology; Feb. 3, 2016 (225 pages).
Delling et al.; Round-Based Public Transit Routing; Microsoft Research Silicon Valley; Karlsruhe Institute of Technology; Feb. 2016; retrieved Feb. 17, 2020; (11 pages).
Delling et al.; Fast and Exact Public Transit Routing with Restricted Pareto Sets; 2019; (12 pages).
U.S. Appl. No. 16/595,394, Dec. 19, 2019, Office Action.
U.S. Appl. No. 16/595,394, Jun. 9, 2020, Office Action.
U.S. Appl. No. 16/595,394, Oct. 15, 2020, Office Action.
U.S. Appl. No. 16/595,394, Sep. 17, 2021, Notice of Allowance.
U.S. Appl. No. 17/648,148, Dec. 20, 2022, Ex Parte Quayle Action.
U.S. Appl. No. 17/648,148, Mar. 1, 2023, Notice of Allowance.
U.S. Appl. No. 16/595,429, Jan. 8, 2020, Office Action.
U.S. Appl. No. 16/595,429, Jun. 5, 2020, Office Action.
U.S. Appl. No. 16/595,429, Oct. 8, 2020, Notice of Allowance.
U.S. Appl. No. 16/595,399, Jan. 6, 2020, Office Action.
U.S. Appl. No. 16/595,399, Jun. 18, 2020, Office Action.
U.S. Appl. No. 16/595,399, Dec. 16, 2020, Office Action.
U.S. Appl. No. 16/595,399, Jun. 9, 2021, Office Action.
U.S. Appl. No. 16/595,399, Nov. 23, 2021, Notice of Allowance.
U.S. Appl. No. 16/595,399, Mar. 24, 2022, Office Action.
U.S. Appl. No. 16/595,399, Oct. 5, 2022, Office Action.
U.S. Appl. No. 16/595,399, Mar. 1, 2023, Notice of Allowance.
U.S. Appl. No. 16/595,387, Jan. 9, 2020, Office Action.
U.S. Appl. No. 16/595,387, Jun. 11, 2020, Notice of Allowance.
U.S. Appl. No. 16/993,532, Dec. 8, 2021, Office Action.
U.S. Appl. No. 16/993,532, Apr. 15, 2022, Notice of Allowance.
U.S. Appl. No. 17/816,201, Nov. 25, 2022, Office Action.
U.S. Appl. No. 17/816,201, Feb. 22, 2023, Notice of Allowance.
U.S. Appl. No. 16/836,141, Apr. 21, 2023, Office Action.
U.S. Appl. No. 18/355,844, Apr. 8, 2024, Notice of Allowance.
U.S. Appl. No. 16/836,141, May 22, 2024, Office Action.
U.S. Appl. No. 18/355,844, Feb. 15, 2024, Office Action.
U.S. Appl. No. 16/836,141, Jan. 3, 2024, Office Action.
U.S. Appl. No. 16/836,141, Sep. 29, 2024, Notice of Allowance.

TRANSPORTATION ROUTE PLANNING AND GENERATION

CROSS-REFERENCE TO RELATED APPLICATIONS

The present application is a continuation of U.S. application Ser. No. 17/648,148, filed on Jan. 17, 2022, which is a continuation of U.S. application Ser. No. 16/595,394, filed on Oct. 7, 2019, now U.S. Pat. No. 11,226,208. The aforementioned applications are hereby incorporated by reference in their entirety.

BACKGROUND

Individuals desiring transportation (e.g., transportation by vehicle) between two locations can submit transportation requests to transportation providers. In particular, users may identify specific locations between which transportation is desired. In response, transportation providers may identify multiple modes of transportation that may be used to transport the user between the identified locations.

SUMMARY

The present disclosure presents new and innovative systems and methods for generating and planning multi-modal transportation proposals. In a first aspect, a system is provided comprising a processor and a memory. The memory may store instructions which, when executed by the processor, cause the processor to receive, from a mobile device, a request for transportation to a destination location, identify an origin location of the mobile device, and determine modalities that are available to satisfy the request for transportation from the origin to the destination, wherein the modalities comprise a walking modality and a personal mobility modality. The memory may store further instructions which, when executed by the processor, cause the processor to determine respective segments for the modalities, combine at least a subset of the respective segments to form a route between the origin and the destination, wherein the at least a subset of the respective segments includes (i) a first segment corresponding to the personal mobility modality and (ii) a second segment corresponding to the walking modality, and transmit the route to the mobile device for display on the mobile device.

In a second aspect according to the first aspect, the first segment is longer than the second segment.

In a third aspect according to the second aspect, the second segment is less than or equal to 400 meters long and the first segment is greater than 400 meters long.

In a fourth aspect according to any of the first through third aspects, the personal mobility modality includes at least one of a bike modality and a scooter modality.

In a fifth aspect according to any of the first through fifth aspects, determining the respective segments comprises determine a battery level of a personal mobility vehicle associated with the personal mobility modality and determine the first segment based on the battery level of the personal mobility vehicle.

In a sixth aspect according to the fifth aspect, determining the first segment based on the battery level comprises determining a range of the personal mobility vehicle based on the battery level of the personal mobility vehicle and determining the first segment to have a distance less than or equal to the range of the personal mobility vehicle.

In a seventh aspect according to any of the first through third aspects, the at least a subset of the respective segments further includes a third segment corresponding to a third modality comprising at least one of an automobile modality, an autonomous automobile modality, a train modality, a bus modality, a boat modality, and a ferry modality.

In an eighth aspect according to the seventh aspect the first segment corresponds to a personal mobility vehicle and the third segment corresponds to a third vehicle associated with the third modality, and wherein the third vehicle is used to transport the personal mobility vehicle.

In a ninth aspect according to any of the seventh and eighth aspects, the third modality is selected according to a user preference associated with the transportation request.

In a tenth aspect according to the ninth aspect, the user preference specifies at least one of: (i) at least one preferred modality, (ii) a route preference for routes that include certain locations, (iii) a travel time preference for routes with short travel times, (iv) a cost preference for routes with low costs, (v) a health preference for routes associated with higher calorie expenditures, and (vi) an environmental preference for routes with lower resulting greenhouse gas emissions.

In an eleventh aspect according to any of the seventh through tenth aspects, the third modality is at least one of the automobile modality and the autonomous automobile modality, and the at least a subset of the respective segments includes a fourth segment corresponding to at least one of the train modality and the bus modality.

In a twelfth aspect according to any of the first through eleventh aspects, the mobile device displays at least an indication of the personal mobility modality and an indication of the walking modality.

In a thirteenth aspect, a method is provided comprising receiving, from a mobile device, a request for transportation to a destination location, identifying an origin location of the mobile device, and determining modalities that are available to satisfy the request for transportation from the origin to the destination, wherein the modalities comprise a walking modality and a personal mobility modality. The method may further include determining respective segments for the modalities, combining at least a subset of the respective segments to form a route between the origin and the destination, wherein the at least a subset of the respective segments includes (i) a first segment corresponding to the personal mobility modality and (ii) a second segment corresponding to the walking modality, and transmitting the route to the mobile device for display on the mobile device.

In a fourteenth aspect according to the thirteenth aspect, the first segment is longer than the second segment.

In a fifteenth aspect according to the fourteenth aspect, the second segment is less than or equal to 400 meters long and the first segment is greater than 400 meters long.

In a sixteenth aspect according to the fifteenth aspect, the personal mobility modality includes at least one of a bike modality and a scooter modality.

In a seventeenth aspect according to any of the thirteenth through sixteenth aspects, determining the respective segments comprises determining a battery level of a personal mobility vehicle associated with the personal mobility modality and determining the first segment based on the battery level of the personal mobility vehicle.

In an eighteenth aspect according to the seventeenth aspect, determining the first segment based on the battery level comprises determining a range of the personal mobility vehicle based on the battery level of the personal mobility vehicle and determining the first segment to have a distance less than or equal to the range of the personal mobility vehicle.

In a nineteenth aspect according to any of the thirteenth through eighteenth aspect, the at least a subset of the respective segments further includes a third segment corresponding to a third modality comprising at least one of an automobile modality, an autonomous automobile modality, a train modality, a bus modality, a boat modality, and a ferry modality.

In a twentieth aspect according to the nineteenth aspect, the first segment corresponds to a personal mobility vehicle and the third segment corresponds to a third vehicle associated with the third modality, and wherein the third vehicle is used to transport the personal mobility vehicle.

In a twenty-first aspect according to any of the nineteenth and twentieth aspects, the third modality is selected according to a user preference associated with the transportation request.

In a twenty-second method according to the twenty-first aspect, the user preference specifies at least one of: (i) at least one preferred modality, (ii) a route preference for routes that include certain locations, (iii) a travel time preference for routes with short travel times, (iv) a cost preference for routes with low costs, (v) a health preference for routes associated with higher calorie expenditures, and (vi) an environmental preference for routes with lower resulting greenhouse gas emissions.

In a twenty-third aspect according to any of the nineteenth through twenty-second aspects, the third modality is at least one of the automobile modality and the autonomous automobile modality, and the at least a subset of the respective segments includes a fourth segment corresponding to at least one of the train modality and the bus modality.

In a twenty-fourth aspect according to any of the thirteenth through twenty-third aspects, the mobile device displays at least an indication of the personal mobility modality and an indication of the walking modality.

In a twenty-fifth aspect, a non-transitory, computer-readable medium is provided storing instructions which, when executed by a processor, cause the processor to receive, from a mobile device, a request for transportation to a destination location, identify an origin location of the mobile device, and determine modalities that are available to satisfy the request for transportation from the origin to the destination, wherein the modalities comprise a walking modality and a personal mobility modality. The non-transitory, computer-readable medium may store further instructions which, when executed by the processor, cause the processor to determine respective segments for the modalities, combine at least a subset of the respective segments to form a route between the origin and the destination, wherein the at least a subset of the respective segments includes (i) a first segment corresponding to the personal mobility modality and (ii) a second segment corresponding to the walking modality, and transmit the route to the mobile device for display on the mobile device.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1A:
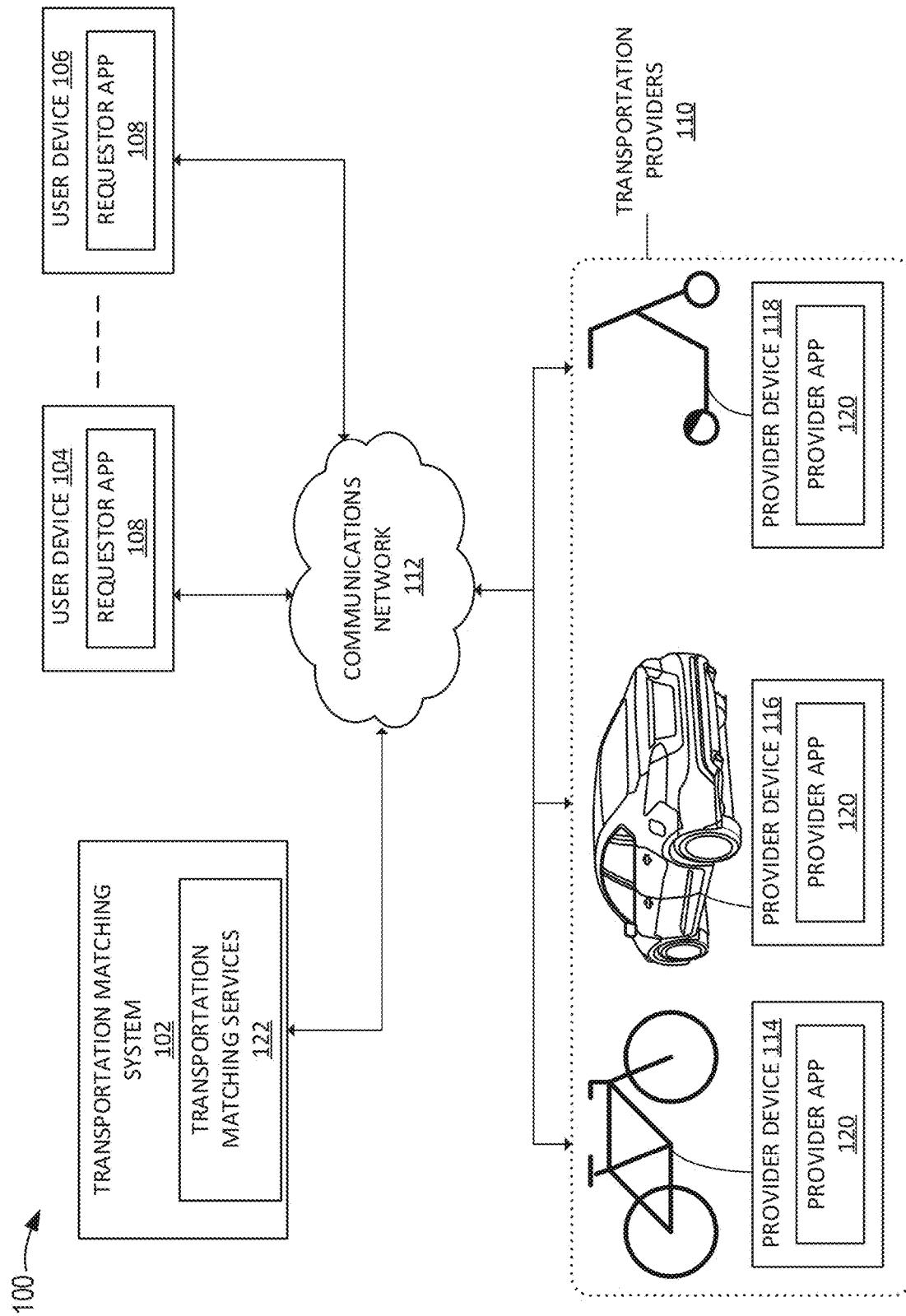
FIG. 1A illustrates a transportation matching system according to exemplary embodiments of the present disclosure.

Aspects of the present disclosure involve systems and methods for generating transportation proposals identifying transportation routes between at least two locations. Each transportation proposal may include one or more transportation segments and each transportation segment may be associated with a specific modality indicating a specific mode of transportation a user should engage when traveling along the transportation segment. The generated transportation proposal may be presented for display on a user device, such as a mobile device. Techniques related to those discussed in the present disclosure are also discussed in (i) U.S. application Ser. No. 16/595,429, filed on Oct. 7, 2019, and titled "TRANSPORTATION PROPOSAL FILTRATION, COMPARISON, AND INCONVENIENCE MEASUREMENT," (ii) U.S. application Ser. No. 16/595,387, filed on Oct. 7, 2019, and titled "MULTI-MODAL TRANSPORTATION ROUTE DEVIATION DETECTION AND CORRECTION," and (iii) U.S. application Ser. No. 16/595,399, filed on Oct. 7, 2019, and titled "MULTI-MODAL TRANSPORTATION PROPOSAL GENERATION". The disclosures of these applications are hereby incorporated by reference.

Various processes and systems currently exist for determining transportation proposals that identify transportation routes between two locations, such as an origin location and a destination location. For example, many transportation providers use such processes and systems to provision vehicles for transporting users from a first, starting location, to a second, ending location. Transportation providers may include transportation networking companies (TNCs). TNCs may implement a transportation system that matches transportation requests with a dynamic transportation network of vehicles. In certain instances, the vehicles may include road-going vehicles and/or personal mobility vehicles. In some examples, some of the vehicles may be standard commercially available vehicles and some of the vehicles may be owned and/or operated by individuals. In some implementations, the vehicles may additionally or alternatively be autonomous (or partly autonomous). Accordingly, throughout the instant disclosure, references to a "vehicle operator" (or an "operator") may, where appropriate, refer to a human driving a vehicle, an autonomous vehicle control system, an autonomous vehicle, an owner of an autonomous vehicle, an operator of an autonomous vehicle, an attendant of an autonomous vehicle, a requesting user piloting a vehicle, and/or an autonomous system for piloting a vehicle. In one example, the TNC may implement multiple transportation systems, where each transportation system is responsible for coordinating transportation matching for a specific geographic region or set number of vehicles.

The transportation system may communicate with computing devices associated with the vehicles in the network, which may be separate computing devices and/or may be computing devices that are integrated into the respective vehicles. In some examples, one or more of the computing devices may be mobile devices, such as a smart phone. Additionally or alternatively, one or more of the computing devices may be tablet computers, personal digital assistants, or any other type or form of mobile computing device. Additionally, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or an operator for a transportation matching application, a navigation application, and/or any other application suited for use by requestors and/or operators). Additionally or alternatively, one or more of the computing devices may be devices suitable for installing in a vehicle and/or may be a vehicle's computer that has a transportation management system application installed on the computer to provide transportation services to transportation requestors and/or communicate with the transportation system.

FIG. 1A illustrates an example system 100 for matching transportation requests to a network of transportation vehicles according to one embodiment of the present disclosure. As illustrated, a transportation matching system 102 may communicate with user devices 104-106 requesting transportation. In some examples, the user devices 104-106 requesting transportation may include a requestor app 108 implemented by the transportation provider. The requestor app 108 may represent any application, program, and/or module that may provide one or more services related to requesting transportation services. For example, the requestor app 108 may include a transportation matching application for requestors. In some examples, the requestor app may match the user of the requestor app 108 (e.g., a transportation requestor) with transportation providers 110 through communication with the transportation matching system 102 via the communications network 112. In addition, the requestor app 108 may provide the transportation matching system 102 with information about a requestor (including, e.g., the current location of the requestor) to enable the transportation matching system 102 to provide dynamic transportation matching services for the requestor and one or more transportation providers 110, each of which may include a provider device 114, 116, 118. Each provider device may include a provider app 120, which may be any application program and/or set of instructions that may provide one or more services related to operating a vehicle and/or providing transportation matching services in conjunction with the transportation matching system 102 and the requestor app 108.

In some examples, the requestor app 108 may coordinate communications and/or a payment between a requestor and a transportation provider 110. According to some embodiments, the requestor app 108 may provide a map service, a navigation service, a traffic notification service, and/or a geolocation service. The provider app 120 may provide similar functions. In other implementations, the requestor app 108 may allow users to request access to certain vehicles, such as personal mobility vehicles (e.g., bikes and/or scooters).

The transportation matching system 102 may arrange transportation on an on-demand and/or ad-hoc basis by, e.g., matching one or more transportation requestors with one or more transportation providers 110. For example, the transportation matching system 102 may provide one or more transportation matching services 122 for a networked transportation service, a ridesourcing service, a taxicab service, an automobile-booking service, an autonomous vehicle service, a personal mobility vehicle service, or some combination and/or derivative thereof. The transportation matching system 102 may include and/or interface with any of a variety of subsystems that may implement, support, and/or improve the transportation matching services 122. For example, the transportation matching services 122 may include or otherwise interface with a matching system (e.g., that matches requestors to ride opportunities and/or that arranges for requestors and/or providers to meet), a mapping system, a routing system (e.g., to help a provider reach a requestor, to help a requestor reach a provider, and/or to help a provider reach a destination), a rating system (e.g., to rate and/or gauge the trustworthiness of a requestor and/or a provider), a payment system, and/or an autonomous or semi-autonomous driving system. The transportation matching system 102 may be implemented on various platforms, including a requestor-owned mobile device, a computing system installed in a vehicle, a server computer system, or any other hardware platform capable of providing transportation matching services to one or more requestors and/or providers.

Figure 1B:
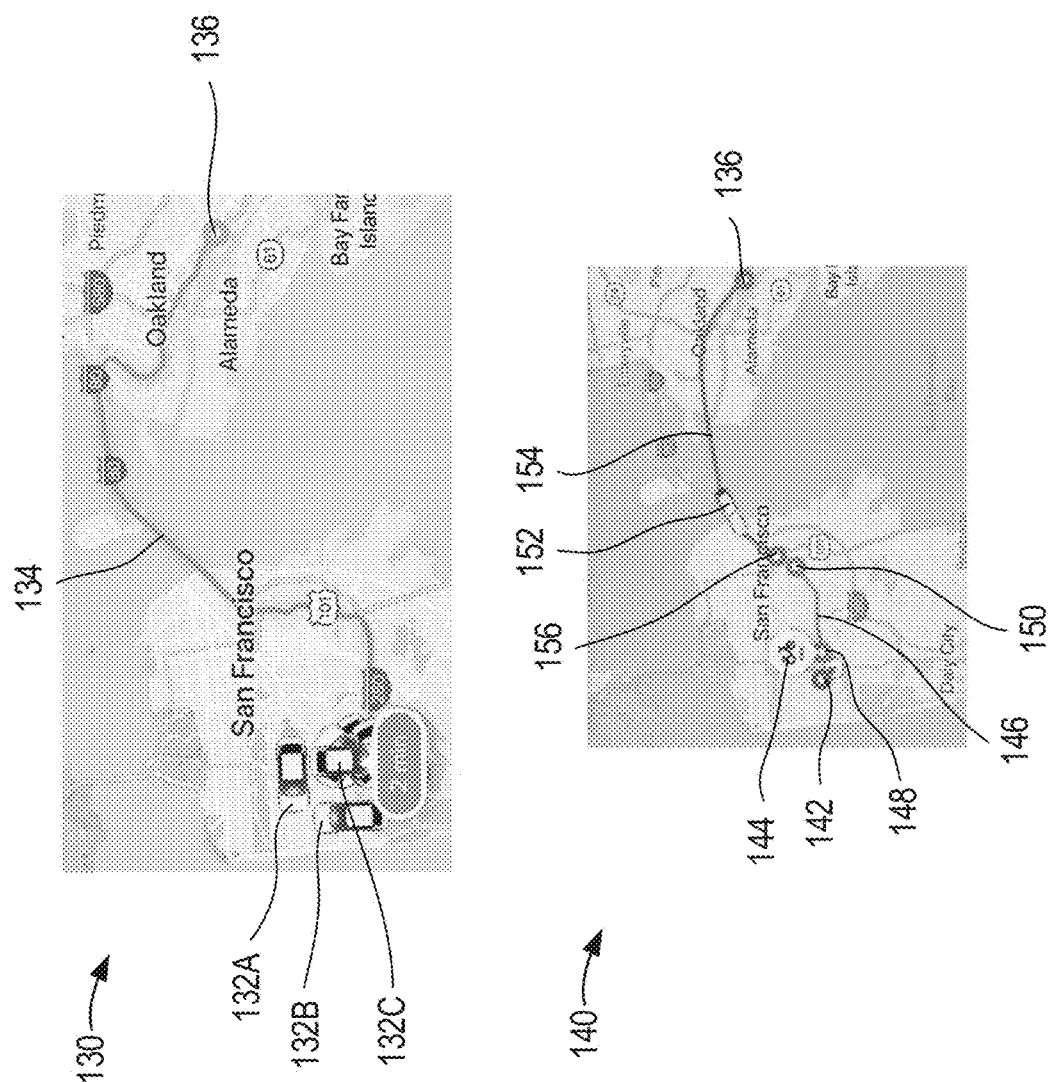
FIG. 1B illustrates a transportation scenario according to an exemplary embodiment of the present disclosure.

Existing transportation matching systems are typically configured to identify and provide a particular modality of transportation between starting and ending locations. For example, FIG. 1B depicts a transportation route 130 identifying a particular modality of transportation between a starting location (not labelled) and an ending location 136. The transportation route 130 includes a single transportation segment 134 between the starting location and the ending location 136. The transportation segment 134, as generated, is to be serviced by one of the automobiles 132A-C. For example, a user requesting transportation from the starting location to the ending location 136 may be picked up by one of the automobiles 132A-C and driven along the route indicated by the transportation segment 134 to the ending location 136.

In certain implementations, the transportation matching system may analyze and/or recommend transportation routes using modalities other than automobiles. For example, where the starting location and ending location 136 are closer together (e.g., shorter rides), the transportation matching system may generate transportation routes that utilize a personal mobility vehicle (e.g., a bike or a scooter). As another example, the transportation matching system may determine that a given starting location and/or ending location 136 are near transit stops for public transportation systems. In such a scenario, the transportation matching system may generate a transportation route from the starting location that utilizes a public transportation modality (e.g., a bus or a train).

Typical transportation matching systems, however, may not be able to generate transportation routes that combine multiple modalities into a single transportation proposal. Therefore, such transportation matching systems cannot capture cost or time savings associated with combining multiple modalities into a single transportation proposal. For example, in certain instances (e.g., during rush hour traffic), automobile-based modalities may be comparatively slower than other modalities, such as bikes or scooters. As another example, during rush hour or periods of high road congestion, it may be faster to take the train (i.e., use a public transit modality) between the two locations rather than to drive (i.e., use an automobile modality) between the two locations. In such a scenario, existing transportation matching systems may recommend public transportation modalities between starting and ending locations for users located near transit stops. But such a recommendation may not be useful for all users. For instance, users that are not in close proximity to a transit stop may have to walk long distances over a significant amount of time to access the transit stop from their starting location. Alternatively, such users may have to walk long distances over a significant amount of time to leave a transit stop and arrive at their ending location. In either scenario, using public transportation may be slower than traveling by automobile. Such users may therefore be recommended transportation routes using automobiles, such as the automobiles 132A-C.

Nevertheless, even users located far away from public transportation may receive faster transportation if they were able to use other modalities for transportation to the transit stops. For example, FIG. 1B also depicts a transportation route 140 for transportation between starting location 142, which corresponds to the starting location of the transportation route 130, and ending location 136. Rather than fulfilling the entire transportation route 140 with a single modality as in the transportation route 130, the transportation route 140 includes two transportation segments 146, 154 fulfilled by two different modalities (e.g., two different types of vehicles 144, 152). In particular, transportation segment 146 is fulfilled by bike 144 and transportation segment 154 is fulfilled by train 152. While following the transportation route 140, a user may walk from starting location 142 to location 148 at the beginning of the transportation segment 146 and pick up a bike 144 (e.g., a docked or dockless bike available for short term rental and/or use). The user can then ride the bike 144 from the location 148 to the location 150 at the end of the transportation segment 146 and drop off the bike 144 (e.g., at a bike dock or bike rack) before walking to location 156 at the start of segment 154. The location 156 may correspond to a transit station (e.g., a train station), and the user may board the train 152 for transportation to the ending location 136 at the end of the segment 154.

By generating transportation routes with multiple modalities, the transportation matching system may combine the benefits of each type of modality. For example, bikes, scooters, and/or walking may be optimal for traveling short or medium distances (e.g., first-mile and last-mile legs of multi-modal transportation proposals), while automobiles and trains may be better for longer distances. Similarly, automobiles may be more flexible in scheduling and routing, but may be more expensive, while trains and buses may be less flexible but also less expensive. By combining any one of these modalities into a single transportation proposal, transportation routes such as the transportation route 140 may capitalize on the relative benefits of each type of modality. For example, during rush hour or periods of high road congestion, the transportation route 140 may be able to allow more users to quickly and conveniently access faster and less expensive transportation via trains 152 (in comparison to automobiles). In another example, transportation by automobile may be faster and easier if disparate passengers meet at a common pick-up location, or if new passengers travel to pick-up locations closer to an existing route for an operator. In such instances, transportation proposals can be generated that identify transportation routes that guide users to use personal mobility vehicles for transportation to such pick-up locations.

Therefore, there exists a need to generate transportation routes that utilize different modalities. Additionally, these transportation routes have to be generated quickly (e.g., in real-time) to allow for subsequent processing after generation of the transportation routes (e.g., filtering and ranking) and before presentation of the transportation routes to a user. In particular, transportation routes that utilize different modalities may have to be generated and stored with enough information to enable users, interested in pursuing the transportation routes, to successfully follow the actions required to complete the route (e.g., use a specific modality along a specific route).

One solution to this problem is to automatically generate and store a transportation proposal for transportation between designated locations. The transportation proposal may include transportation segments, which may correspond to segments of a transportation route between the designated locations. The transportation segments may also correspond to different modalities for transportation. In certain instances, the transportation segments may also include transportation actions that specify actions required to follow the transportation proposal.

Figure 2:
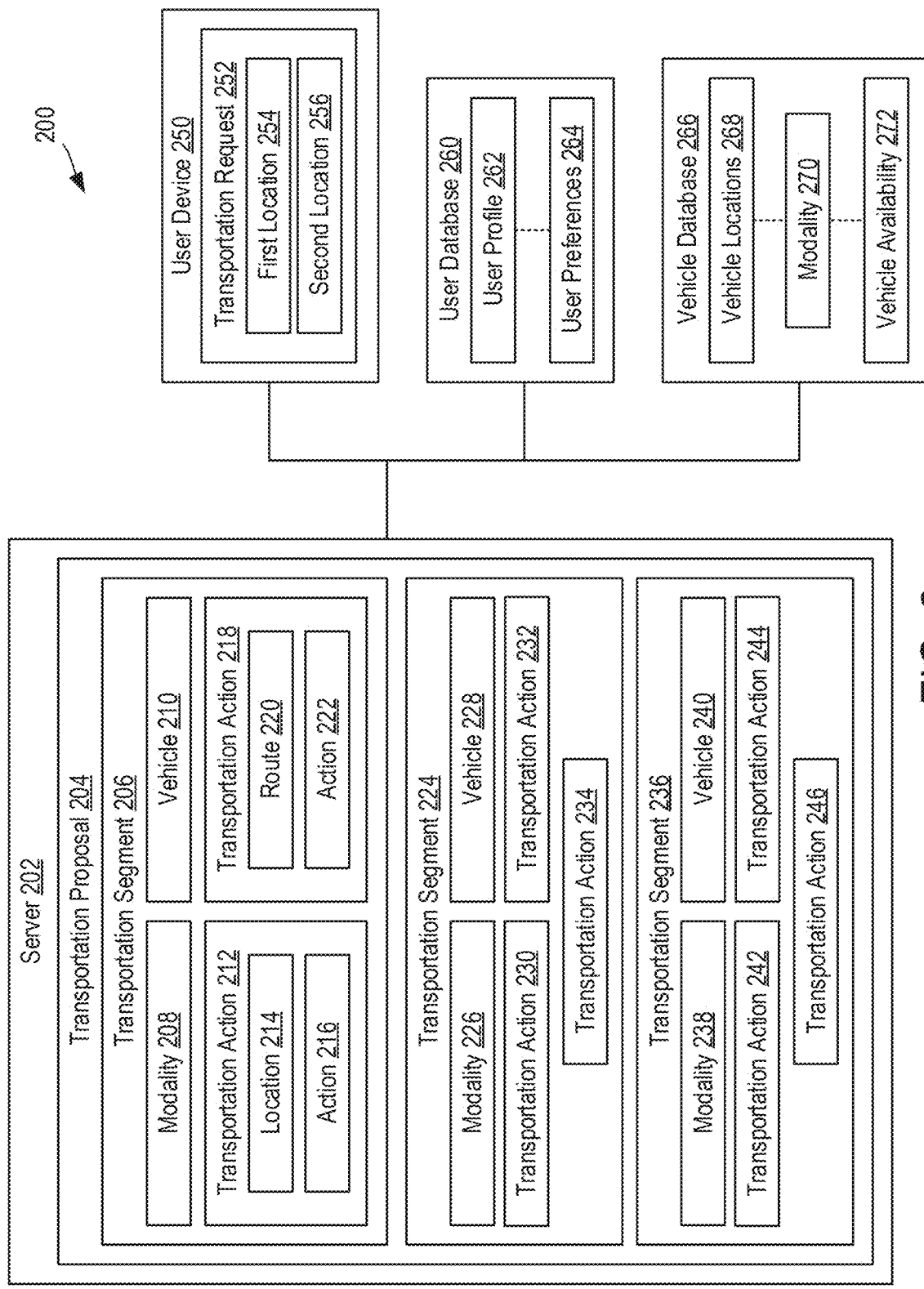
FIG. 2 illustrates a system according to an exemplary embodiment of the present disclosure.

FIG. 2 depicts a system 200 according to an exemplary embodiment of the present disclosure. The system 200 may be configured to receive and process transportation requests and to generate transportation proposals for providing transportation according to the transportation requests. In particular, the system 200 may be configured to generate transportation proposals that utilize more than one modality to fulfill the transportation request. The system 200 includes a server 202, a user device 250, a user database 260, and a vehicle database 266.

The user device 250 may be configured to generate transportation requests 252 and to transmit the transportation requests to the server 202 (e.g., via a network connection). The user device 250 may include one or more computing devices, such as a smart phone, computer, tablet computer, and/or wearable computing device. The transportation requests 252 may specify a first location 254 and a second location 256. For example, the transportation request 252 may request transportation from the first location 254 (e.g., an origin location) to the second location 256 (e.g., a destination location).

The server 202 may be configured to receive the transportation requests 252 from the user device 250 and to generate a transportation proposal 204 that may specify one or more routes, options, plans, itineraries, and/or selections for transportation that fulfills the transportation request 252. In one example, the transportation proposal 204 may provision and/or provide details for transportation from the first location 254 to the second location 256, as specified in the transportation request 252.

In some instances, the transportation proposal 204 may include one or more transportation segments 206, 224, 236, which may correspond to different steps or subsets of transportation between the first location 254 and the second location 256. Each transportation segment 206, 224, 236 may have a corresponding modality 208, 226, 238 and/or vehicle 210, 228, 240. The modalities 208, 226, 238 may specify a type of transportation. For example, the modalities 208, 226, 238 may include one or more of transportation by automobile, transportation by bus, transportation by train, transportation by personal mobility vehicle, and transportation by walking. Transportation by a personal mobility vehicle may include transportation by vehicles capable of transporting individual users. Transportation by a personal mobility vehicle may include transportation by rideable vehicles, such as transportation by scooter and transportation by bike, may include transportation by a docked vehicle (e.g., a vehicle that has to be accessed from and returned to docks in fixed locations) and/or transportation by an undocked or dockless vehicle (e.g., a vehicle that does not have to be returned to docks).

Each of the transportation segments 206, 224, 236 includes a vehicle 210, 228, 240. The vehicles 210, 228, 240 may be associated with the modality 208, 226, 238 (e.g., may be vehicles 210, 228, 240 of the type specified by the modality 208, 226, 238) and may be selected to provide transportation to fulfill at least a portion of the transportation proposal 204 associated with the transportation segments 206, 224, 236. For example, the vehicles 210, 228, 240 may include one or more of an automobile (e.g., an autonomous automobile, a semi-autonomous automobile, and/or an automobile operated by a vehicle operator), a train, a bus, a boat, a ferry, a bike (e.g., a docked or dockless bike), and a scooter. In certain implementations, the vehicle 210, 228, 240 may identify a specific vehicle for use in fulfilling the transportation segments 206, 224, 236. In other implementations, the vehicles 210, 228, 240 may specify a location from which a vehicle may be accessed to fulfill the transportation segment (e.g., a dock from which a bike can be accessed, or a transit stop from which a train or bus can be accessed). In certain implementations, one or more transportation segments 206, 224, 236 may not include a vehicle 210, 228, 240. For example, where the modality 208, 226, 238 of a transportation segment 206, 224, 236 is transportation by walking, the transportation segment 206, 224, 236 may not specify a vehicle 210, 228, 240 because no vehicle 210, 228, 240 is necessary. As another example, if a transportation segment 206, 224, 236 occurs far enough in the future (e.g., more than 10, 20, or 30 minutes in the future), specific vehicles 210, 228, 240 may not be assigned to service the transportation segment 206, 224, 236 because the locations of any assigned vehicles 210, 228, 240 may change before the transportation segment 206, 224, 236 begins.

The server 202 may identify the vehicles 210, 228, 240 based on the vehicle database 266. In particular, the vehicle database 266 may track and store current (e.g. real time) vehicle locations 268 in association with a modality 270. The vehicle locations 268 may specify current locations for one or more vehicles associated with the modality 270. The vehicle database 266 may also store a vehicle availability 272 in association with the modality 270. The vehicle availability 272 may specify a current availability of vehicles associated with the modality 270. For example, for personal mobility vehicles, the vehicle availability 272 may specify whether the personal mobility vehicles are currently in use. Similarly, for transportation by automobile, the vehicle availability 272 may specify whether the automobile currently has a customer. As another example, for transportation by automobile, the vehicle availability 272 may specify how many passengers the automobile currently has (e.g., whether the automobile has room for additional passengers).

The server 202 may use the vehicle availability 272 and/or modality 270 to select the vehicles 210, 228, 240 for the transportation segments 206, 224, 236. For example, the server 202 may identify vehicles based on the vehicle locations 268 that are located near or between the first location 254 and the second location 256. The server 202 may also determine, based on the vehicle availability 272, which of the vehicles are available to provide transportation in association with the transportation request 252. For example, the server 202 may identify vehicles that are not in use, do not have passengers, and/or will be available to service a request before an anticipated time of a transportation segment 206, 224, 236 as potential vehicles for the transportation segment 206, 224, 236. The server 202 may then select between the potential vehicles to assign the vehicles 210, 228, 240 to the transportation segments 206, 224, 236.

For certain modalities 270, rather than storing locations of the vehicles themselves, the vehicle database 266 may store other types of locations associated with the modality 270. In certain implementations, the vehicle locations 268 may include locations from which vehicles may be accessed. For example, for transportation by bus and/or transportation by train, the vehicle locations 268 may indicate transit stops where a user can board or disembark buses or trains associated with the vehicle locations 268. As another example, for transportation by docked personal mobility vehicle, the vehicle locations 268 may indicate the predefined, fixed locations of docks from which the personal mobility vehicles can be accessed. In such implementations, the vehicle availability 272 may indicate the availability of vehicles at the locations associated with the modality. For example, for transportation by docked bike, the vehicle availability 272 may indicate an availability level (e.g., a number of available bikes or percentage of total bikes available) for the docks located at the vehicle locations 268. As another example, for transportation by dockless bike, the vehicle availability 272 may indicate whether specific bikes are available for user. In still further implementations, the vehicle availability 272 may indicate times at which vehicles are available at the vehicle locations 268. For example, for transportation by bus or transportation by train, the vehicle availability 272 may indicate the times at which buses or trains arrive at and/or depart from the transit locations identified by the vehicle locations 268.

In still further implementations, the vehicle database 266 may store predicted information regarding vehicles associated with modalities 270. For example, the vehicle locations 268 may store predicted future locations of vehicles associated with the modality 270 and the vehicle availability 272 may include predicted future availability of vehicles associated with the modality 270. The server may use this information to identify vehicles 210, 228, 240 or modalities 208, 226, 238 for transportation segments 206, 224, 236 that correspond to future actions. For example, the transportation segments 224, 236 may occur after the transportation segment 206. Accordingly, locations of vehicles associated with the modalities 226, 238 may change during performance of the transportation segment 206. The server 202 may accordingly utilize predicted locations and/or predicted availability to identify vehicles that are expected to be available at the start of transportation segment 224. In certain implementations, rather than identifying specific vehicles 228, 240 when generating the transportation proposal 204, the server 202 may include modalities 226, 238 identifying a type of transportation for certain transportation segments 224, 236 and may select associated vehicles 228, 240 later (e.g., closer to when transportation identified by the transportation segments 224, 236 begins).

Although depicted as storing vehicle locations 268 and vehicle availability 272 in association with a single modality 270, the vehicle database 266 may store such information regarding multiple modalities. For example, the vehicle database 266 may store information regarding each of the modalities discussed above.

The transportation segments 206, 224, 236 may include transportation actions 212, 218, 230, 232, 234, 242, 244, 246, each of which specify one or more actions to be performed by a user or other vehicle operator necessary to provide transportation according to the transportation segment 206, 224, 236. For example, the transportation actions 212, 218 include actions 216, 222. The actions 216, 222 may specify, e.g., actions required to initiate or perform the transportation associated with the transportation segment 206. For example, the transportation action 212 may specify that a user access a bike from a location 214 and the transportation action 218 may specify that the user ride the bike along a particular route 220. The transportation actions 230, 232, 234, 242, 244, 246 may include similar actions and/or information.

In certain embodiments, the transportation proposal 204 may specify transportation according to two or more modalities (i.e., two or more different types of transportation). For example, the modalities 208, 226, 238 of the transportation segments 206, 224, 236 may differ from one another. The server 202 may be configured to select the modalities 208, 226, 238 based on information stored in the vehicle database 266 and/or the user database 260. For example, the server 202 may compare the first location 254 and the second locations 256 to the vehicle location 268 and the vehicle availability 272 to determine whether vehicles are available to service all or part of a transportation route between the first location 254 and the second location 256. The server 202 may also use information stored in the user database 260 to identify modalities for servicing the transportation request 252. The user database 260 may store information regarding user profiles 262. The user profiles 262 may include information regarding users who submit transportation requests 252. For example, the user database 260 may store user preferences 264 in association with user profiles 262. The user preferences 264 may specify preferred or disliked transportation modalities for a user associated with the user profile 262. For example, the user preferences 264 may specify one or more preferred modalities and/or one or more disliked modalities of a user associated with the user profile. The user preferences 264 may also specify that a user has a route preference for routes that include certain locations (e.g., faster, slower, more scenic roads) or routes that avoid certain locations (e.g., dangerous, frequently-congested roads). The user preferences 264 may also specify that a user has preferences for certain types of routes, such as a cost preference for routes that are less expensive, a health preference for healthier routes (e.g., routes with a higher calorie expenditures), and/or an environmental preference for routes that are more environmentally friendly (e.g., have lower resulting greenhouse gas emissions). The user preferences 264 may be user specified (e.g., entered and/or configured by a user associated with the user profile 262) and/or may be derived from user behaviors (e.g., previous acceptance and/or rejection of previous transportation proposals). The server 202 may analyze user preferences 264 stored in association with a user profile 262 that submitted the transportation request 252. The server 202 may then select one or more of the modalities 208, 226, 238 based on the user preferences 264 (e.g., to include preferred modalities and/or to exclude disliked modalities).

In certain implementations, the server 202 may generate more than one transportation proposal 204. For example, the server 202 may generate multiple transportation proposals 204 in response to the received transportation request 252. The server 202 may then select from among the generated transportation proposals 204 one or more transportation proposals 204 for presentation to the user device 250.

One or more of the server 202, the user device 250, the user database 260, and the vehicle database 266 may be implemented by a computer system. For example, one or more of the server 202, the user device 250, the user database 260, and the vehicle database 266 may include a processor and/or memory configured to implement one or more operational features. In particular, the memory may store instructions which, when executed by the processor, cause the processor to implement the one or more operational features of the server 202, the user device 250, the user database 260, and/or the vehicle database 266.

Figure 3A:
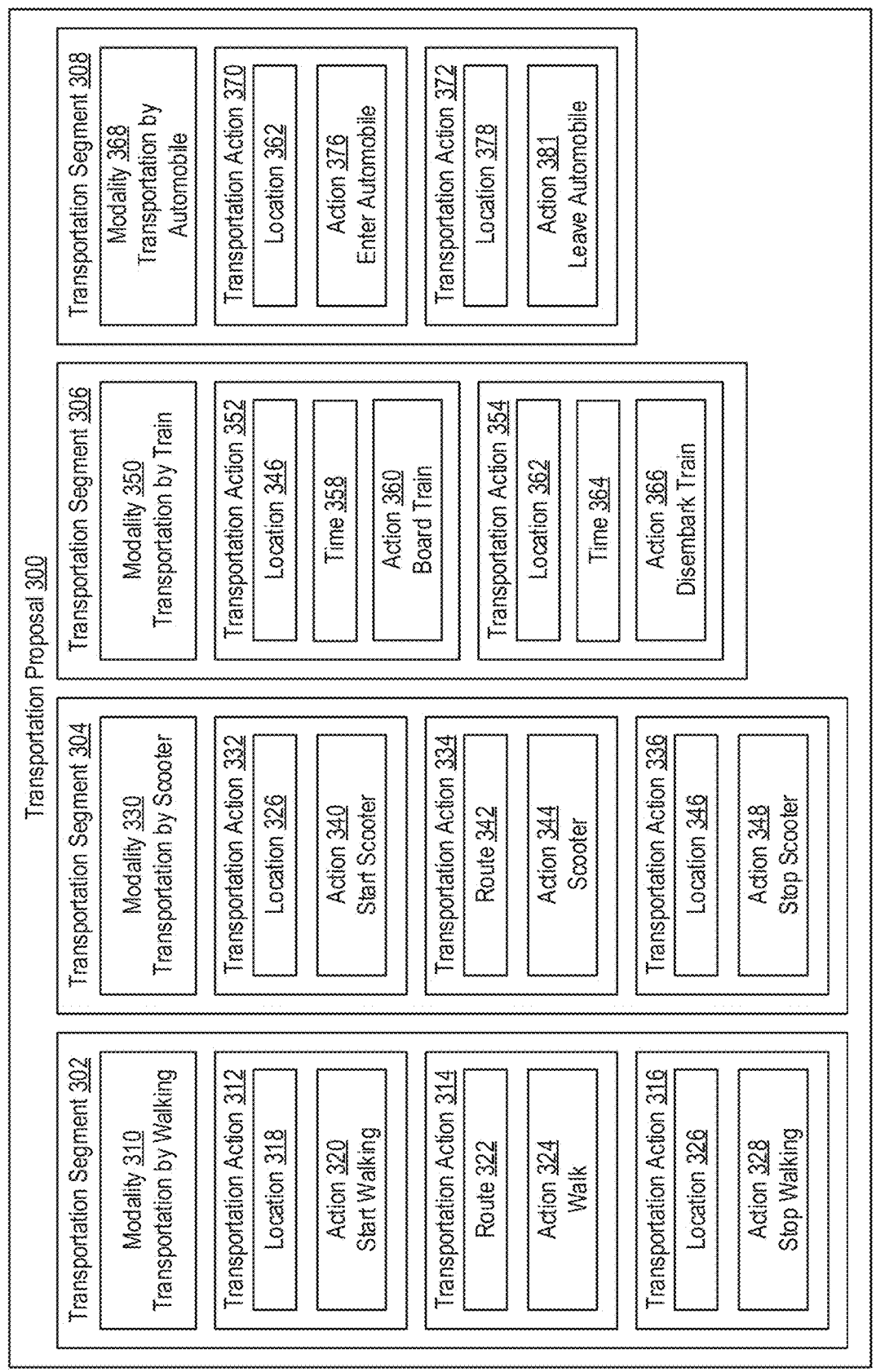
FIGS. 3A-3B illustrate transportation proposals according to exemplary embodiments of the present disclosure.
Figure 3B:
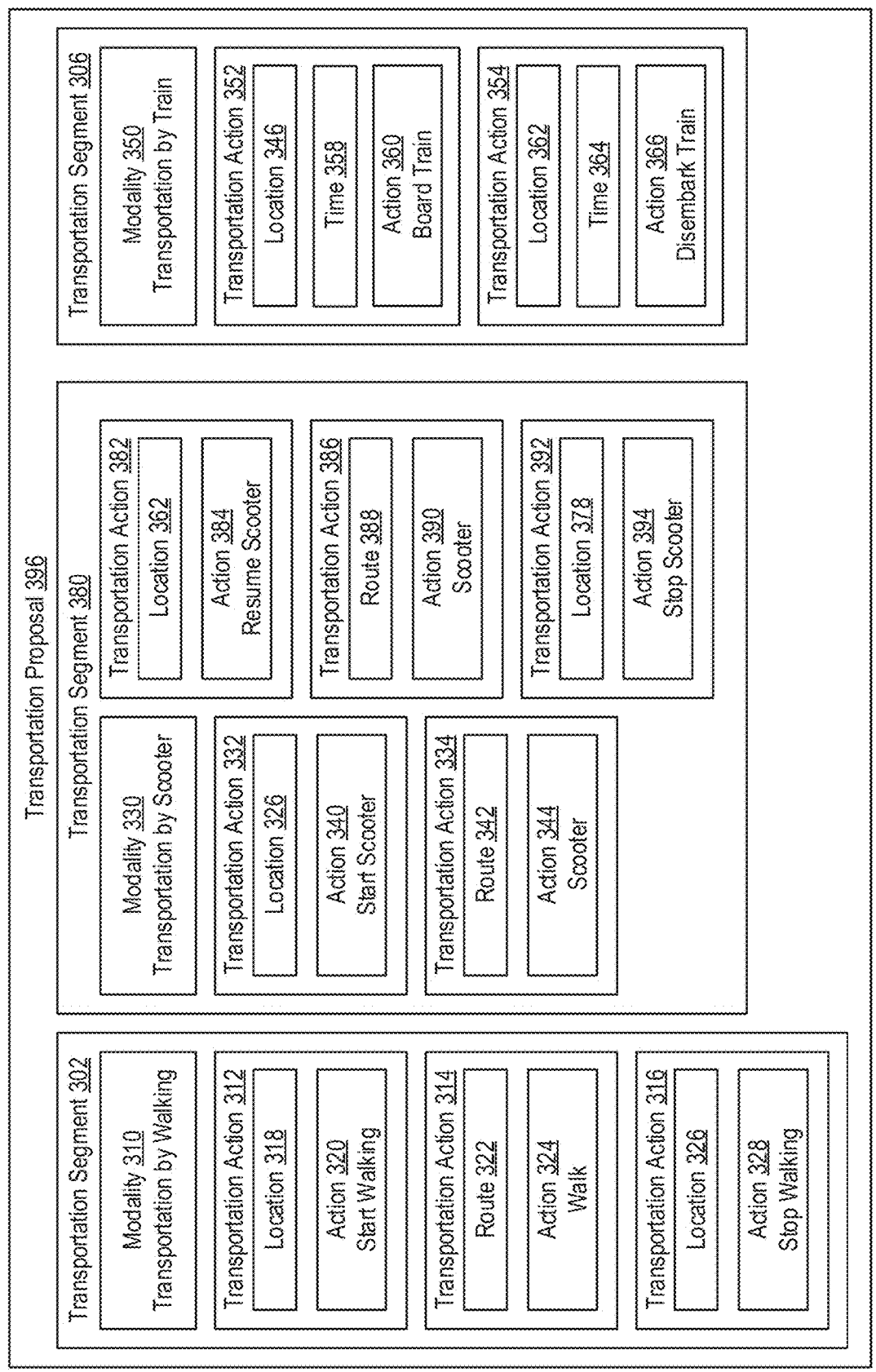

FIGS. 3A-3B illustrate transportation proposals 300, 396 according to exemplary embodiments of the present disclosure. The transportation proposals 300, 396 may depict exemplary implementations of the transportation proposals 204 generated by the server 202 in response to a transportation request 252. Referring initially to FIG. 3A, the transportation proposal 300 includes four transportation segments 302, 304, 306, 308. Each of the transportation segments 302, 304, 306, 308 includes a single modality 310, 330, 350, 368. In particular, the transportation segment 302 corresponds to the modality 310 of transportation by walking, the transportation segment 304 corresponds to the modality 330 of transportation by scooter, the transportation segment 306 corresponds to the modality 350 of transportation by train, and the transportation segment 308 corresponds to the modality 368 of transportation by automobile. In combination, a user following the transportation segments 302, 304, 306, 308 may be transported between two desired locations (e.g., the first location 254 and the second location 256 of the transportation request 252).

The transportation segments 302, 304, 306, 308 each include multiple transportation actions 312, 314, 316, 332, 334, 336, 352, 354, 370, 372. The transportation actions 312, 314, 316, 332, 334, 336, 352, 354, 370, 372 may specify actions a user may take in order to receive or otherwise engage in transportation according to the transportation segments 302, 304, 306, 308 and the transportation proposal 300. For example, the transportation actions 312, 314, 316, 332, 334, 336, 352, 354, 370, 372 may specify how a user can access vehicles associated with certain modalities (e.g., accessing or unlocking bikes or scooters, being picked up in an automobile, boarding a train or bus). In some instances, the transportation actions 312, 314, 316, 332, 334, 336, 352, 354, 370, 372 may be associated with certain locations. These locations may specify where a user should perform or follow actions associated with the transportation actions 312, 314, 316, 332, 334, 336, 352, 354, 370, 372. For example, the transportation action 312 specifies with action 320 that the user should start walking at a location 318 (e.g., according to the modality 310 of transportation by walking). The location 318 may correspond to a starting location of the user (e.g., the first location 254 of a received transportation request 252). Transportation action 314 specifies with action 324 that a user should walk along the route 322. Also, transportation action 316 specifies with action 328 that the user should stop walking at location 326. Accordingly, by following the transportation actions 312, 314, 316, the user will walk from the location 318 to the location 326.

The transportation actions 332, 334, 336 of the transportation segment 304 similarly specify the actions a user should take to utilize a scooter for transportation. At transportation action 332, the user will start riding a scooter according to action 340 at location 326. The location 326 is the same for both transportation actions 316 and 332. The common location 326 may indicate that the user stops walking at the location of a scooter available for use and starts riding the scooter according to action 340. Transportation action 334 indicates that the user should ride the scooter along the route 342. At transportation action 336, the user may stop riding the scooter at the location 346 according to action 348.

According to transportation action 352 of the transportation segment 306, the user may then board a train according to action 360 at the location 346. As transportation actions 336 and 352 both include the same location 346, the user may stop riding the scooter at a transit station located at location 346 and board a train located at the location 346 (i.e., the same location). Transportation action 352 also includes a time 358, which may designate a time by which a user has to board the train according to action 360. For example, the time 358 may indicate when the train a user is supposed to board will depart from the transit station, or a time at which the train will arrive at the transit station. Transportation action 354 corresponds to the user disembarking the train at location 362 according to action 366 at a time 364.

At transportation action 370 of the transportation segment 308, the user may then enter an automobile according to action 376 at the location 362. For example, the user may enter an automobile operated by another person or operated by an autonomous or semi-autonomous vehicle system at a pickup location near the transit stop at location 362 where the user disembarked the train according to action 366. The automobile may been drive the user from location 362 to location 378 of the transportation action 372, at which point the user may leave the automobile according to action 381.

By following the transportation actions 312, 314, 316, 332, 334, 336, 352, 354, 370, 372 of the transportation segments 302, 304, 306, 308, the user may follow a multimodal transportation route corresponding to the transportation proposal 300. In particular, the user may walk to a scooter, scooter to a transit stop associated with a train, ride the train to a second transit stop associated with the train, and ride in an automobile to their final destination.

Other multi-modal routes may be generated for transportation between the same locations 318, 378. For example and with reference to FIG. 3B, the transportation proposal 396 provides an alternative multi-modal transportation route between the locations 318, 378. The transportation proposal 396 includes transportation segments 302, 306, identical to the transportation proposal 300. However, the transportation segment 380 corresponding to the modality 330 of transportation by scooter differs from the transportation segment 304 of the transportation proposal 300. Transportation segment 380 includes the transportation actions 332, 334 by which a user starts riding a scooter at location 326 and follows a route 342. The route 342 may lead the user to the location 346 of transportation action 352 (e.g., a transit stop associated with a train), at which the user may board the train according to action 360. However, the transportation segment 380 does not indicate that the user stops using the scooter at the location 346. Rather, after disembarking the train according to action 366 at location 362 of the transportation action 354, the user resumes scootering at location 362 according to action 384 of transportation action 382. The user then rides the scooter according to action 390 along route 388 of the transportation action 386 and stops riding the scooter at location 378 according to action 394 of the transportation action 392. Therefore, by following the transportation actions 312, 314, 316, 332, 334, 352, 354, 382, 386, 392, the user may walk to a scooter, which the user rides to the transit station at location 346 and brings the scooter with them onto the train when boarding according to action 360. Then, after disembarking the train (i.e., with the scooter) according to action 366 at location 362, the user may ride the scooter to their final destination at location 378. In the transportation proposal 396, the transportation segments 306, 380 may be considered parallel transportation segments because of the transportation segment 306 occurs while the transportation segment 380 is still in progress (e.g., after the transportation segment 380 begins and before completing the transportation segment 380), as the user will not complete their scooter ride until reaching their final destination at location 378.

Transportation proposals such as the transportation proposal 396 that include parallel transportation segments 306, 380 may assist with reallocating vehicles as needed according to marketplace conditions. For example, personal mobility vehicles such as bikes or scooters may typically be needed in different locations at different times (e.g., according to typical user traffic, ridership patterns, and/or the like). Typically, such personal mobility vehicles may be manually relocated (e.g., by service workers associated with or working on behalf of a TNC). Such relocation services may incur additional costs, for example, to pay the service workers who manually relocate the personal mobility vehicles. However, transportation proposals that instruct users to travel with personal mobility vehicles (e.g., bikes, scooter) using other modalities (e.g., trains, buses, automobiles) may allow for targeted reallocation of personal mobility vehicles with minimal additional cost. For example, if the server 202 determines that a user associated with a received transportation request 252 is traveling to a location at which personal mobility vehicles are likely to be in high demand in the future, the server 202 may generate a transportation proposal such as the transportation proposal 396 that instructs the user to travel with the personal mobility vehicle using another modality (i.e., using a train, a bus, and/or an automobile). In certain implementations, transportation proposals 396 that include such parallel transportation segments 306, 380 may be discounted at least in part to account for the defrayed cost of relocating the personal mobility vehicle. Parallel transportation segments may also be generated to transport vehicles other than personal mobility vehicles. For example, a transportation proposal may be generated to transport an automobile using a boat or ferry.

Figure 4A:
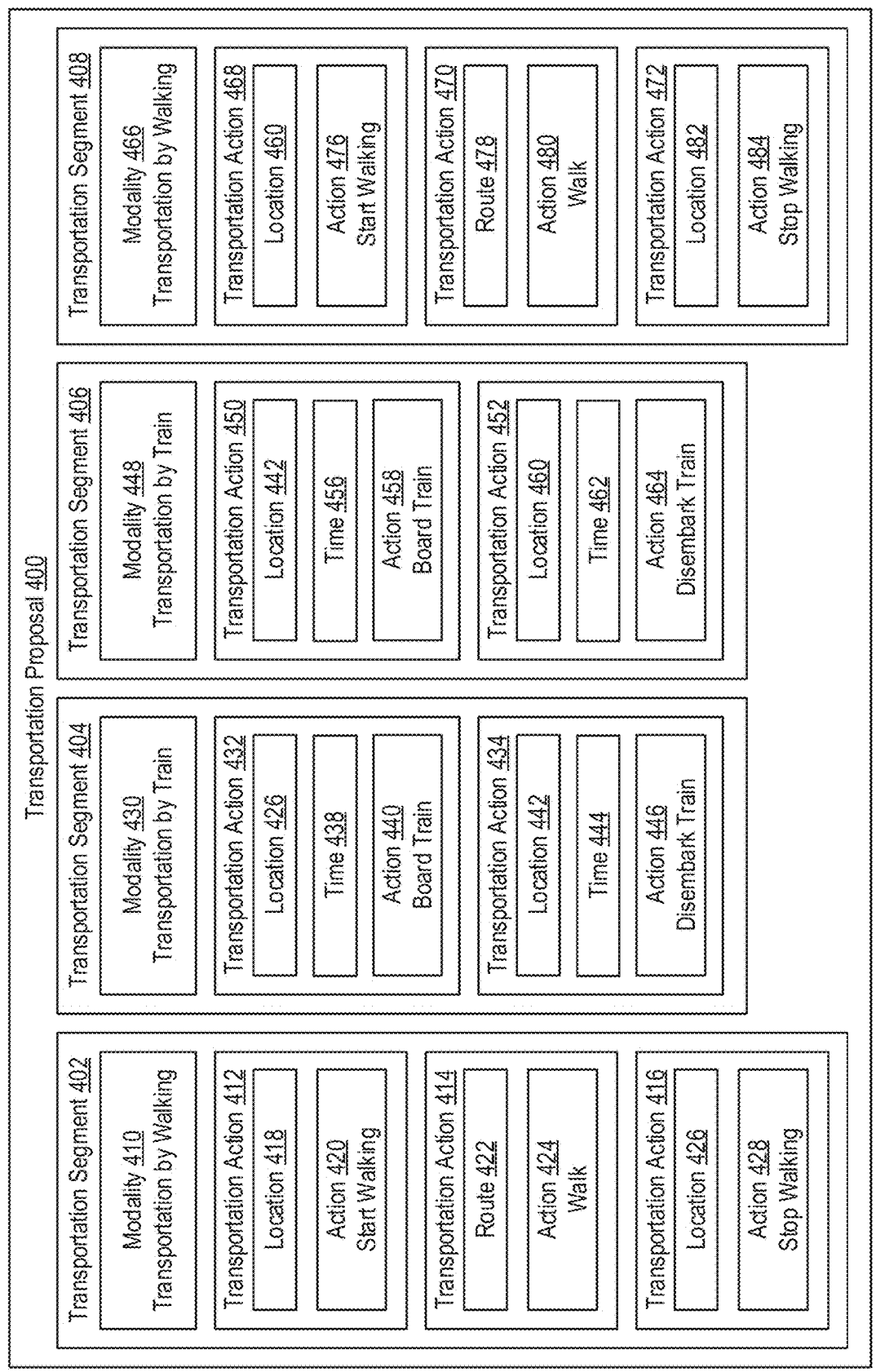
FIGS. 4A-4B illustrate transportation proposals according to exemplary embodiments of the present disclosure.
Figure 4B:
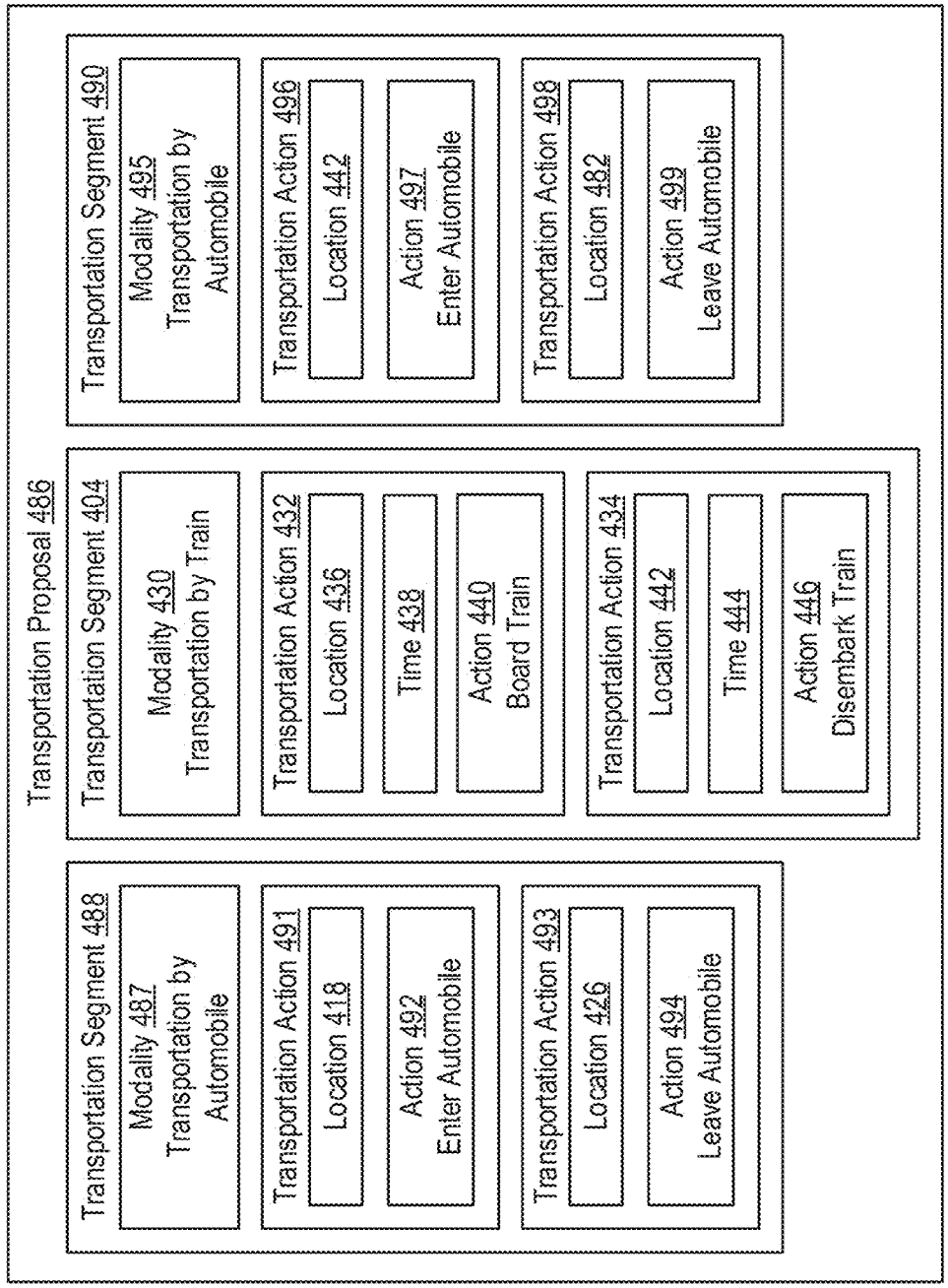

FIGS. 4A-4B illustrate transportation proposals 400, 486 according to exemplary embodiments of the present disclosure. The transportation proposals 400, 486 may depict exemplary implementations of the transportation proposals 204 generated by the server 202 in response to a transportation request 252. In particular, the transportation proposals 400, 486 may be example transportation proposals that include segments with modalities of the same type.

Referring initially to FIG. 4A, transportation proposal 400 includes four transportation segments 402, 404, 406, 408. Transportation segment 402 corresponds to the modality 410 of transportation by walking. In particular, transportation action 412 indicates that a user will start walking according to action 420 from a location 418. Transportation action 414 specifies that a user will walk along a route 422 according to action 424 until, according to transportation action 416, the user will stop walking at the location 426 according to action 428. For the transportation action 432 of the transportation segment 404, a user may then board a train at the location 426 at time 438. The user may ride the train until disembarking the train according to action 446 of the transportation action 434 at location 442 and at time 444. The user may then board a second train at location 442 and time 456 according to action 458 of the transportation action 450 of the transportation segment 406. For example, according to transportation segments 404, 406 the user may transfer trains in order to travel closer to the final destination. The user may then ride the second train to location 460 according to transportation action 452, at which point the user may disembark the train as specified in action 464 at the time 462. The user may then walk to their final destination as indicated in the transportation segment 408. In particular, according to transportation action 468, the user may start walking at location 460 as specified in action 476 after disembarking the second train. The user may then walk along the route 478 according to action 480 of the transportation action 470. The user may then arrive at their final destination at location 482 and may stop walking according to action 484 of the transportation action 472.

By following the transportation proposal 400, the user may walk to a first transit stop according to transportation segment 402 and board a first train at the first transit stop and ride the train to a second transit stop according to transportation segment 404. The user may then board a second train at the second transit stop and ride the second train to another location according to the transportation segment 406 and may walk to their final destination at location 482 according to the transportation segment 408. By combining transportation segments 404, 406 with same modality 430, 448 of transportation by train, the transportation proposal 400 may be better able to utilize existing public transportation or other transportation resources. For example, a user may initially be located closer to a transit station for the first train line, but the first train line may not run close to the user's final destination. However, the second train line may run closer to the user's final destination but may be located further from the user's starting location. By identifying a common location 442 for the first and second train lines, the transportation proposal 400 may allow the user to take two different trains instead of having to rely on different modalities, which may be more expensive and/or slower. The transportation proposal 400 also includes two transportation segments 402, 408 with the same modality 410, 466 of transportation by walking. Such common transportation segments 402, 408 may enable more simple transportation for the user (e.g., it may be easier to walk than to locate and access a personal mobility vehicle) and/or may reduce the overall cost of fulfilling the transportation proposal 400.

Transportation proposals with transportation segments having common modalities may also be generated according to user preferences. For example and with reference to FIG. 4B, the transportation proposal 486 includes transportation segments 488, 490 having modalities 487, 495 of transportation by automobile. Specifically, a user may enter the automobile at their starting location 418 according to action 492 of transportation action 491. The user may then ride the automobile to location 426, at which point the user may leave the automobile according to action 494 of the transportation action 493. The transportation segment 404 is the same for both transportation proposals 400, 486. Accordingly, the user may board the train at location 436 and ride the train to location 442 as discussed above. However, rather than boarding the second train as indicated in transportation segment 406, transportation segment 490 specifies that the user may ride in an automobile to their final destination. Specifically, the user may enter the automobile at location 442 according to action 497 of the transportation action 496. The user may then ride in the automobile to location 442, at which point the user may leave the automobile according to action 499 of transportation action 498.

The transportation proposal 486 may be generated to account for a user's preferences (e.g., user preferences 264 corresponding to a user profile 262 that is associated with a received transportation request 252). For example, the user preferences 264 may indicate that a user associated with the transportation proposal 486 dislikes transportation by walking. Accordingly, the transportation segments 488, 490 may be generated with modalities other than transportation by walking (e.g., transportation by automobile). The user preferences 264 may also indicate that the user does not like transfers between public transit modalities. Accordingly, the transportation segment 490 may be generated to provide transportation from the location 442 at which the user disembarks the train. In alternative implementations (e.g., implementations other than those depicted in FIG. 4B), a transportation segment may be generated such that the user takes a single train and does not disembark the train at location 442 (e.g., takes the train to a different transit stop). Additionally or alternatively, the user preferences 264 may specify that the user prefers transportation proposals 486 that are comparatively faster (e.g., time and/or distance) than other transportation proposals. Accordingly, the modalities 487, 495 may be assigned as transportation by automobile, which may be faster than other modalities such as transportation by walking, transportation by bus, transportation by train, and/or transportation by personal mobility vehicle.

Figure 5A:
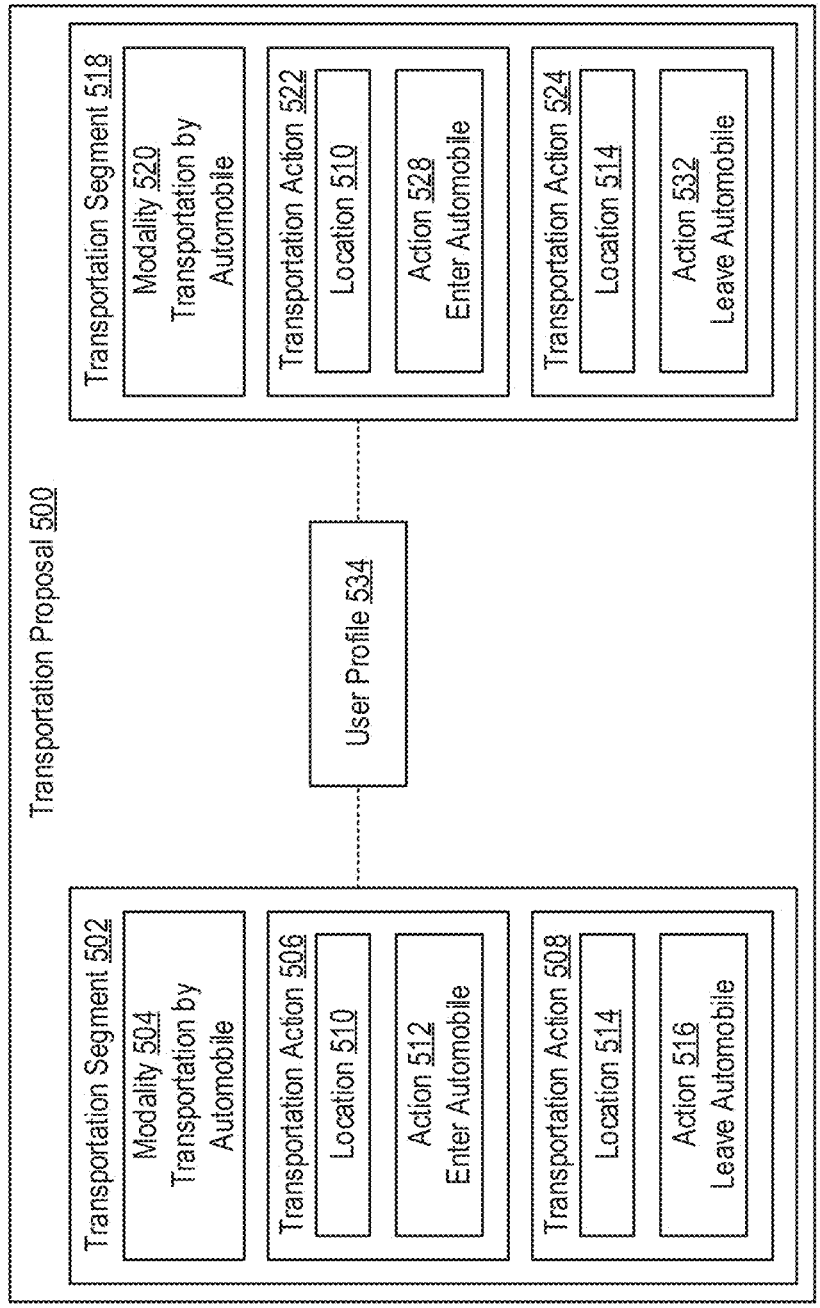
FIGS. 5A-5C illustrate transportation proposals according to exemplary embodiments of the present disclosure.
Figure 5B:
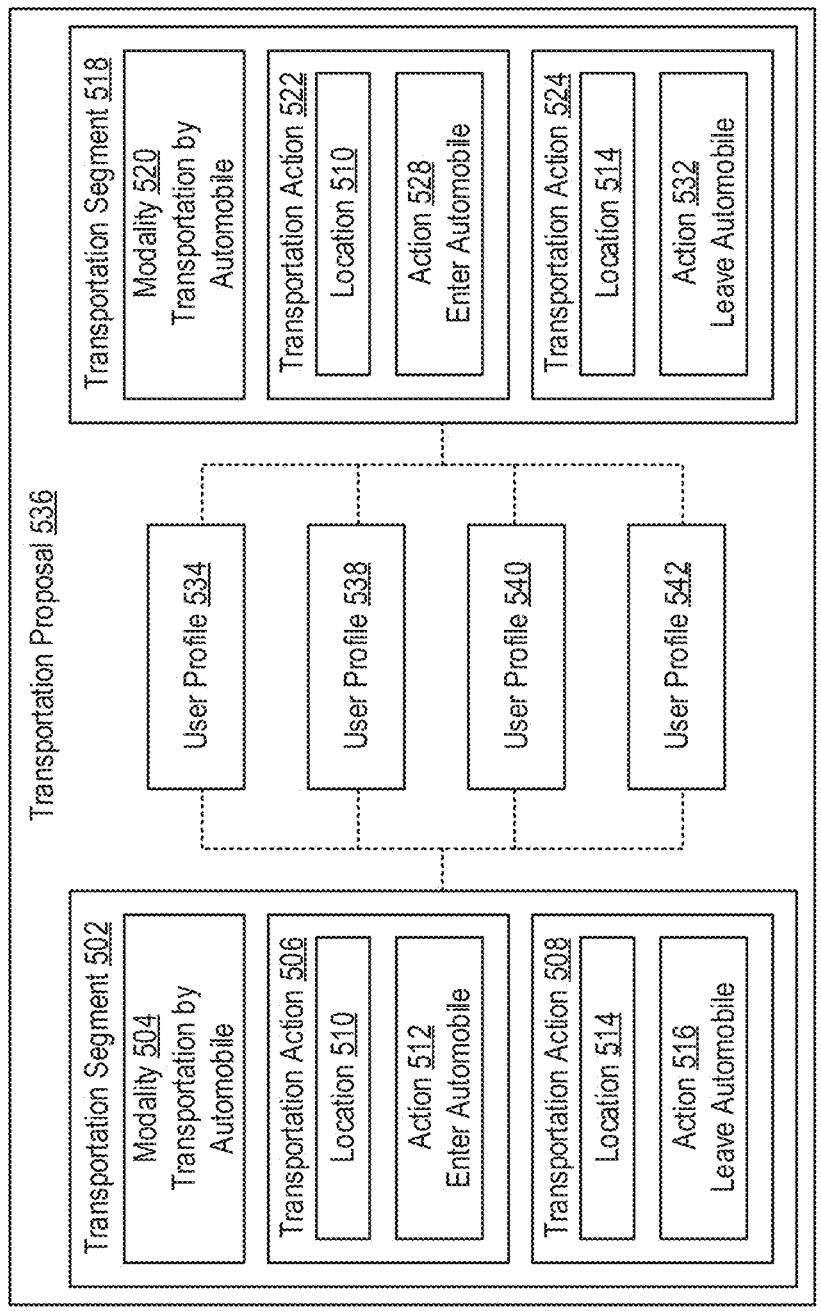
Figure 5C:
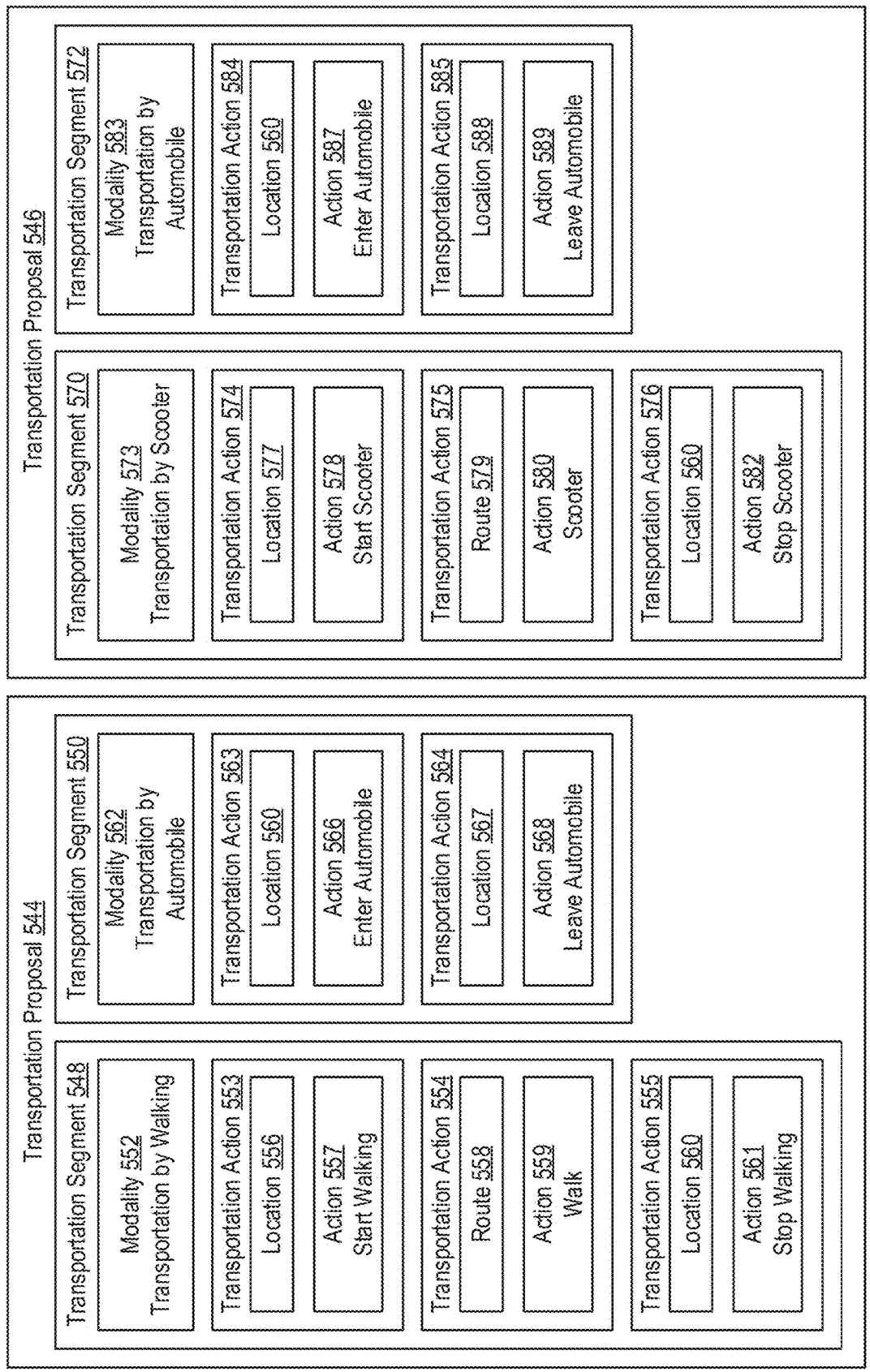

FIGS. 5A-5C illustrate transportation proposals 500, 536, 544, 546 according to exemplary embodiments of the present disclosure. The transportation proposals 500, 536, 544, 546 may be generated to account for one or more associated users. The associated users may be identified by user profiles, such as user profiles 262 stored in the user database 260. Referring initially to FIG. 5A, transportation proposal 500 includes two transportation segments 502, 518 having the same modality 504, 520 transportation by automobile. The transportation segments 502, 518 also have similar transportation actions 506, 508, 522, 524. Both of the transportation actions 506, 522 include actions 512, 528 specifying that the user enter an automobile at location 510. Also, the transportation actions 508, 524 both have actions 516, 532 specifying that the user leave the automobile at location 514. Both transportation segments 502, 518 are associated with a single user profile 534 and may be executed at least partially in parallel (e.g., at least partially at the same time). For example, a user associated with the user profile 534 may request two automobiles for transportation between the same location (e.g., for a number of riders larger than a single automobile can transport). The user associated with the user profile 534 may then be able to centrally process, pay for, and monitor the performance of both transportation segments 502, 518.

Referring to FIG. 5B, the transportation proposal 536 includes identical transportation segments 502, 518 to the transportation proposal 500, but with four corresponding user profiles 534, 538, 540, 542. Multiple user profiles 534, 538, 540, 542 associated with the transportation segments 502, 518 may allow multiple users to process, pay for (e.g., split payment of), and monitor the performance of the transportation segments 502, 518. In certain implementations, different user profiles may be associated with each transportation segments 502, 518. For example, user profiles associated with users riding in the automobiles associated with either the transportation segment 502 or the transportation segment 518 may be assigned to the corresponding transportation segment. In such instances, a user profile associated with the user who requested transportation may also be associated with both transportation segments 502, 518 so the user can process, pay for, and/or monitor performance of both transportation segments 502, 518.

Referring to FIG. 5C, a transportation proposals for a first user may also be generated to include one or more transportation segments that overlap with one or more transportation segments of a different transportation proposal for a different user. For example, the transportation proposals 544, 546 respectively include transportation segments 550, 572 that partially overlap. Specifically, both transportation segments 550, 572 include transportation actions 563, 584 with actions 566, 587 specifying that users associated with the transportation proposals 544, 546 should enter an automobile at location 560. However, the transportation segments 550, 572 include different transportation actions 564, 585 at the end of the associated users' automobile rides. Specifically, the transportation action 564 includes an action 568 specifying that the user should leave the automobile at location 567, while the transportation action 585 includes an action 589 specifying that the user should leave the automobile at location 588. The different ending locations 567, 588 of the transportation segments 550, 572 may result from different destinations for users associated with the transportation proposals 544, 546. For example, the location 567 may correspond to a final destination of a first user associated with the transportation proposal 544, while the location 588 may correspond to a final destination of a second user associated with the transportation proposal 546. In this way, the users associated with the transportation proposals 544, 546 may be able to both utilize a single vehicle, e.g., if users destinations are near one another and/or are in similar directions relative to the users' starting locations. Such overlapping transportation segments 550, 572 may help increase system capacity for a TNC providing the transportation proposals 544, 546 by increasing the number of passengers serviced by each vehicle. Overlapping transportation segments 550, 572 may also reduce the cost to the users associated with the transportation proposals 544, 546 (e.g., because the users can at least partially split the cost of the automobile).

Overlapping transportation segments can also be combined with multi-modal transportation proposal generation. For example, transportation segments utilizing additional modalities may be added before or after one or both of the overlapping transportation segments 550, 572. In particular, transportation segment 548 occurs before transportation segment 550 and includes a modality 552 of transportation by walking. The transportation segment 570 also occurs before the transportation segment 572 and includes a modality 573 of transportation by scooter. Specifically, the transportation segment 548 includes the transportation action 553 with an action 557 specifying that a first user associated with the transportation proposal 544 start walking from the location 556. According to the transportation action 554, the first user may walk along the route 558 according to the action 559 until arriving at the location 560, at which point the user will stop walking as specified in the action 561 of the transportation action 555. The transportation segment 570 also includes a transportation action 574 with an action 578 specifying that a second user associated with the transportation proposal 546 start riding a scooter from their starting location 577. The second user may then ride the scooter along the route 579 according to the action 580 of the transportation action 575 until arriving at the location 560, at which point the action 582 of the transportation action 576 specifies that the user will stop riding the scooter.

By performing the transportation segments 548, 570 before their corresponding overlapping transportation segments 550, 572, the first and second users may be able to meet at the common pick-up location 560. By adding additional transportation segments of other modalities, the transportation proposals 544, 546 may extend the feasibility and benefits of sharing vehicles such as automobiles. For example, the first and second users may be too far apart to feasibly share an automobile to each of their destinations, but may be able to do so if they meet at the location 560 between their two respective starting locations 556, 577. The transportation proposals 544, 546 may also be generated to account for the first and second users' preferences, available transportation modalities, and relative distances to the location 560. For example, the first user may be located closer to the location 560 than the second user and may therefore be able to walk to the location 560 in the time it takes the second user to ride a scooter to the location 560. In another example, the second user may be located near an available scooter, while there may be no such personal mobility vehicles located near the first user, so the second user may be able to scooter while the first user walks. Transportation proposals generated to account for such contextual and preference information may increase the efficiency of utilized transportation resources while also reducing costs and time spent in transportation for users.

Figure 6:
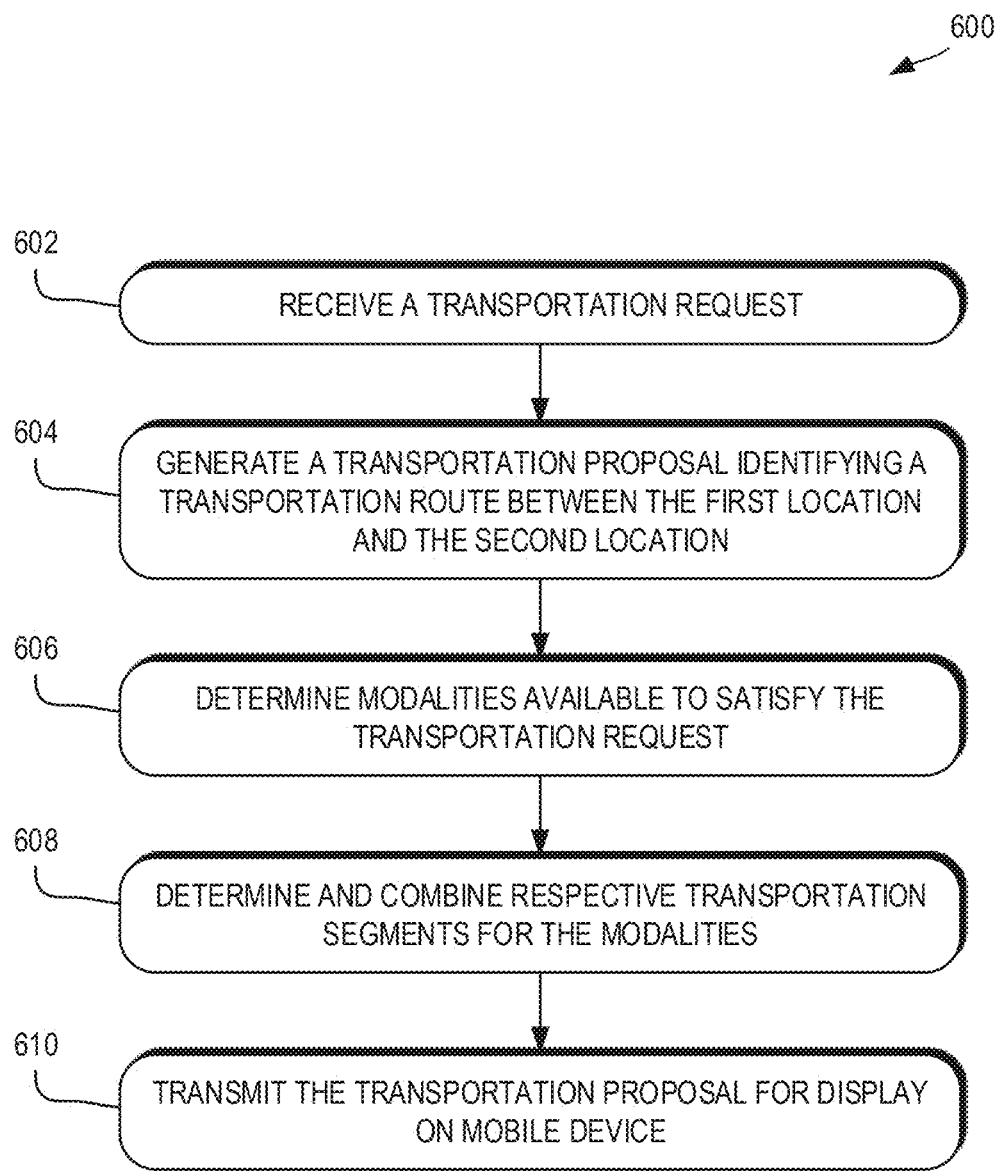
FIG. 6 illustrates a method according to an exemplary embodiment of the present disclosure.

FIG. 6 illustrates a method 600 according to an exemplary embodiment of the present disclosure. The method 600 may be performed to generate transportation proposals in response to received transportation requests. The method 600 may be performed by a computer system, such as the system 200. For example, the method 600 may be performed by the server 202, the user device 250, the user database 260, and/or the vehicle database 266. The method 600 may also be implemented by a set of instructions stored on a computer readable medium that, when executed by a processor, cause the computer system to perform the method 600. For example, all or part of the method 600 may be implemented by a CPU and/or memory of the server 202, the user device 250, the user database 260, and/or the vehicle database 266. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 begins with receiving a transportation request (block 602). For example, and referring to FIG. 2, the server 202 may receive a transportation request 252 from a user device 250. The transportation request 252 may specify a second location 256 (e.g., a destination location to which transportation is desired). In certain implementations, the transportation request 252 may also specify a first location 254 (e.g., an origin location from which transportation is desired). In other implementations, the server 202 may determine a first location 254, for example based on a current location of the user device 250. In certain implementations, the server 202 may receive the transportation request 252 from the user device 250 over a network connection, such as the Internet.

Referring again to FIG. 6, a transportation proposal may be generated that identifies a transportation route between the first location and the second location (block 604). Returning to FIG. 2, the server 202 may generate a transportation proposal 204 in response to receiving the transportation request 252. The transportation proposal 204 may be generated to identify a transportation route between the first location 254 and the second location 256.

Referring again to FIG. 6, to generate the transportation proposal, modalities available to satisfy the transportation request may be determined (block 606). The modalities that are available may be determined according to modalities serviceable by the system. The modalities may include one or more of an automobile modality (e.g., transportation by automobile), an autonomous automobile modality (e.g., transportation by autonomous automobile), a bus modality (e.g., transportation by bus), a train modality (e.g., transportation by train), a boat modality (e.g., transportation by boat), a ferry modality (e.g., transportation by ferry), a bike modality (e.g., transportation by docked or dockless bikes), a scooter modality (e.g., transportation by scooter) and a walking modality (e.g., transportation by walking). In certain implementations, the modalities that are available may be identified as modalities with corresponding vehicles located near the first and/or second locations 254, 256 and/or located between the first and/or second locations 254, 256.

Transportation segments may be determined for the determine modalities and may be combined to form the transportation proposal (block 606). The transportation segments may correspond to a portion of a transportation route between the first location 254 and the second location 256. In particular, transportation segments may identify a portion of a transportation route between the first location 254 and the second location 256 that complies with one or more operational requirements of a corresponding modality. For example, scooters may have shorter range (e.g., may be capable of travelling shorter distances) than other types of vehicles (e.g., trains, buses, automobiles). Accordingly, a transportation segment corresponding to a scooter modality may be generated to cover a shorter portion of the route between the first location 254 and the second location 256. In certain implementations, transportation segments corresponding to rideable modalities (e.g., a bike modality and/or a scooter modality) may be generated to be shorter than for other modalities. For example, the server 202 may determine a battery level of a rideable vehicle (e.g., an electrically powered and/or electrically assisted scooter and/or bike) and may generate a segment corresponding to the rideable modality based on the battery level of the rideable vehicle (e.g., to have a distance less than or equal to a range of the rideable vehicle determined based on the battery level).

The transportation segments for the modalities may be combined to form the transportation proposal. For example, the transportation segments may be combined to form a transportation route between the first location 254 and the second location 256. The combined transportation segments may include transportation segments that specify more than one type of modality. For example, the combined transportation segments may include a first transportation segment corresponding to a rideable modality and a second transportation segment corresponding to a walking modality. In still further examples, the transportation segments may be assigned such that two or more of the transportation segments occur at least partially in parallel. For example, and referring to FIG. 3B, the transportation segments 380, 306 include modalities 330, 350 assigned so that the transportation segments 380, 306 occur at least partially in parallel. Transportation segments that occur at least partially in parallel may include an earlier transportation segment that begins before a later transportation segment and ends after the later transportation segment begins. For example, the transportation segment 380 begins with the user accessing the scooter before the transportation segment 306 begins and ends after the transportation segment 306 ends with the user stopping scootering at their final destination. In still further examples, as discussed in connection with FIGS. 4A-4B, two or more of the combined transportation segments may include modalities specifying the same type of transportation. In particular, in certain instances, two or more adjacent transportation segments may include corresponding modalities specifying the same type of transportation.

In still further implementations, transportation proposals may be generated to include modalities that involve operation of an automobile by a user. For example, a transportation proposal may include a transportation segment corresponding to a user driving their personal vehicle or a rented vehicle to a designated parking location. Upon arriving at the parking location, and paying for parking as necessary, the user may proceed to a subsequent transportation segment corresponding to transportation by personal mobility vehicle. For example, after parking, the user may ride a scooter from the designated parking location to their final destination. The subsequent transportation segment may also involve transportation by automobile. For example, after parking, the user may be picked up in a different vehicle for transportation to their final destination.

In further implementations, when determining the modalities at block 606 and/or when determining the transportation segments at block 608, one or more user profiles may be associated with at least one of the transportation segments, as discussed above in connection with a FIGS. 5A and 5B. In still further implementations, the transportation proposal may be generated to include at least one transportation segment that at least partially overlaps a transportation segment of another transportation proposal (e.g., a transportation proposal associated with a different user), as discussed above in connection with FIG. 5C. For example, the server 202 may receive transportation requests from multiple users with at least partially overlapping routes (e.g., origin and/or destination locations near one another, destinations in similar directions from the origin locations). The server 202 may then identify a modality (e.g., transportation by shared automobile) that can service at least a portion of the overlapping routes. The server 202 may then generate a segment based on the modality that services the portion of the overlapping routes and may combine the transportation segment with other transportation segments to form transportation proposals for the multiple users.

Returning to FIG. 6, the transportation proposal may be transmitted for display on a mobile device (block 610). Referring to FIG. 2, the server 202 may transmit the transportation proposal 204 to the user device 250. The user device 250 may then receive and display the transportation proposal for selection by user. Upon selection, the user may be able to receive transportation as indicated by the transportation proposal 204. In certain implementations, the server 202 may generate multiple transportation proposals in response to a received transportation request 252. In such implementations, the transportation proposal 204 may be transmitted with additional transportation proposals to the user device 250. Additional details regarding display of one or more transportation proposals by the mobile device are discussed further below in connection with FIG. 8.

In certain implementations, when transmitting the transportation proposal to the mobile device, the server may consider user preferences. For example, where the transportation proposal is one of multiple transportation proposals, the transportation proposal may be recommended more highly if it complies with one or more user preferences associated with a user profile associated with the mobile device. In other implementations, a price or cost associated with the transportation proposal may be adjusted to account for one or more marketplace conditions. For example, where completion of the transportation proposal would result in a vehicle of a particular modality being relocated from a location of low demand to a location of high demand for the modality associated with the vehicle, a price or cost associated with the transportation proposal may be reduced to encourage acceptance and/or performance of that transportation proposal.

Figure 7:
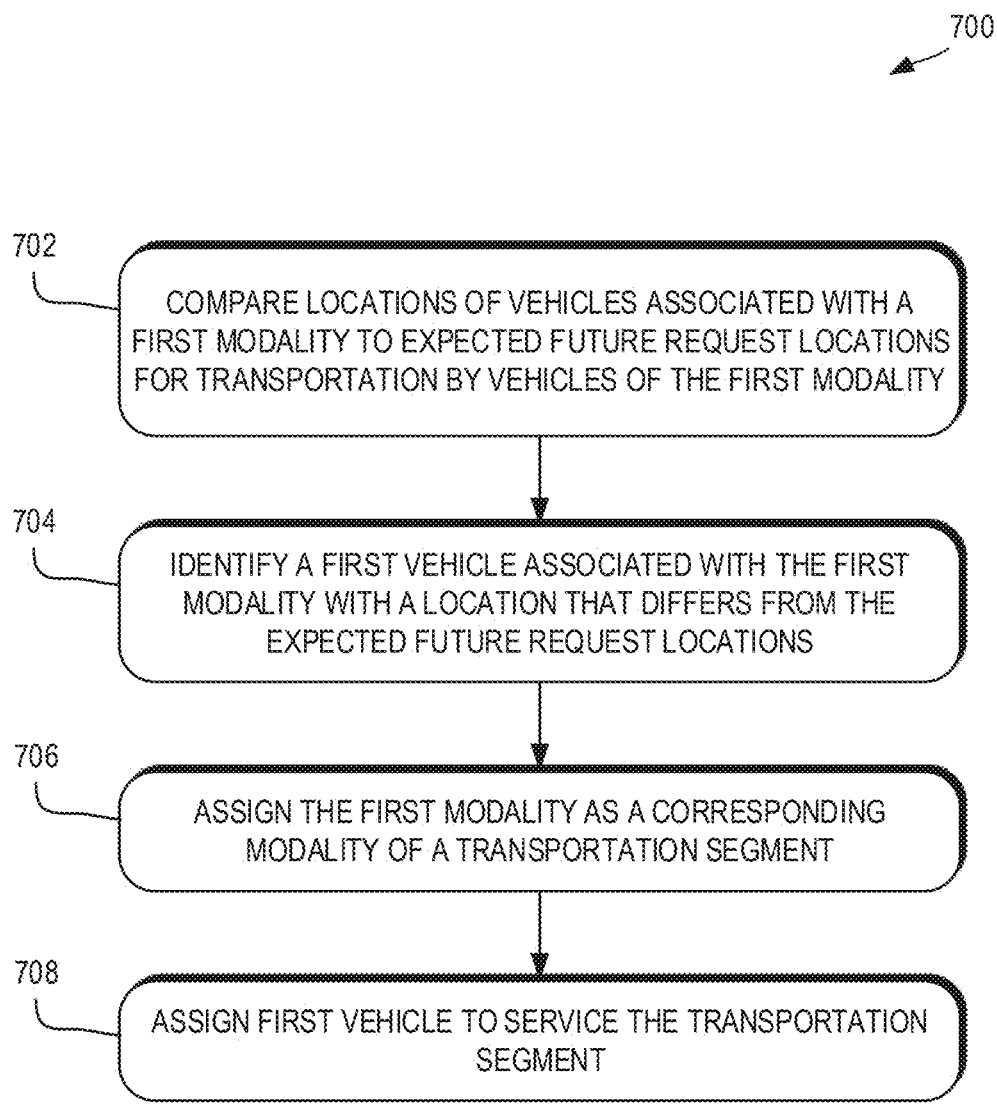
FIG. 7 illustrates a method according to an exemplary embodiment of the present disclosure.

FIG. 7 illustrates a method according to an exemplary embodiment of the present disclosure. The method 700 may be performed to determine modalities and/or transportation segments according to marketplace conditions. For example, all or part of the method 700 may be performed in order to at least partially implement blocks 606 and 608 of the method 600. The method 700 may be performed by a computer system, such as the system 200. For example, the method 700 may be performed by the server 202, the user device 250, the user database 260, and/or the vehicle database 266. The method 700 may also be implemented by a set of instructions stored on a computer-readable medium that, when executed by a processor, cause the computer system to perform the method 700. For example, all or part of the method 700 may be implemented by a CPU and/or memory of the server 202, the user device 250, the user database 260, and/or the vehicle database 266. Although the examples below are described with reference to the flowchart illustrated in FIG. 7, many other methods of performing the acts associated with FIG. 7 may be used. For example, the order of some of the blocks may be changed, certain blocks may be combined with other blocks, one or more of the blocks may be repeated, and some of the blocks described may be optional.

The method 700 begins with comparing locations of vehicles associated with a first modality to expected future request locations for transportation by vehicles of the first modality (block 702). The comparison may be performed to determine whether a distribution of vehicles associated with the first modality differs from a distribution of expected requests for vehicles of the first modality. In particular, the comparison may determine whether there is a misalignment in locations of the vehicles with the distribution of expected requests for the vehicles. Referring to FIG. 2, the locations of the vehicles may be identified using the vehicle database 266. For example, the server 202 may compare vehicle locations 268 associated with the first modality in the vehicle database 266. The locations of the vehicles may include current locations of the vehicles. For example, the current locations of vehicles associated with the first modality may be compared with expected future request locations for vehicles associated with the first modality in the near future (e.g., 10 minutes, 30 minutes). The locations of vehicles may also include predicted future locations of the vehicle. For example, predicted future locations of the vehicle may be compared to expected future request locations further into the future (e.g., 45 minutes, 1 hour). Certain implementations may compare both current and predicted future locations of vehicles.

The first modality may be selected from among a list of potential modalities. For examples, the first modality may be selected from among transportation by automobile, transportation by scooter, transportation by bike, transportation by train, and transportation by bus. In certain implementations, the first modality may be selected according to user preferences. For example, the first modality may be selected as a modality preferred by a user associated with a received transportation request. In certain implementations, the method 700 may be repeated for more than one modality (e.g., may be repeated for each of the list of modalities and/or for each of the modalities preferred by a user associated with the received transportation request).

Returning to FIG. 7, a first vehicle associated with the first modality may then be identified that has a location that differs from expected future request locations (block 704). The first vehicle may be identified based on a misalignment between the locations of vehicles associated with the first modality and expected requests for transportation by vehicles associated with the first modality. For example, the first vehicle may be identified as a vehicle currently located in an area of low demand for the first modality. In another example, the comparison may identify a vehicle that is expected to be located in an area of low demand for the first modality in the future (e.g., after fulfilling a transportation proposal). In a still further example, the comparison may identify a surplus of vehicles associated with the first modality in an area of comparatively low demand for the first modality. For example, there may be 20 scooters in an area that is only expected to receive requests for 10 scooters in the near future (e.g., in the next 30 minutes, one hour, two hours, four hours).

Returning to FIG. 7, the first modality may be assigned as a corresponding modality of a transportation segment (block 706). For example, the first modality may be identified as a modality for which a transportation segment is to be determined at block 608. In certain instances, the transportation segment determined for the first modality may depend on whether the first vehicle was identified based on a current location of the first vehicle or a predicted location of the first vehicle. For example, the first modality may be assigned to an earlier transportation segment if the first modality is identified based on the current location of the first vehicle. As another example, the first modality may be assigned to a later transportation segment if the first modality is identified based on a predicted future location of the first vehicle. In this way, the server 202 may be better able to account for current marketplace conditions while also taking into consideration and preemptively resolving future marketplace conditions.

The first vehicle may also be assigned to service the transportation segment (block 708). For example, and referring to FIG. 2, the transportation segments 206, 224, 236 may store an indication of a vehicle 210, 228, 240 assigned to service the transportation segments 206, 224, 236. In such examples, to assign the first vehicle to the transportation segment 206, 224, 236, an indication of the first vehicle may be stored with the transportation segment. By assigning the vehicle, the method 700 may enable generated transportation proposals to directly address misalignments of vehicle locations with marketplace conditions. In particular, where the transportation segment to which the first vehicle is assigned occurs in the near future, fulfillment of the transportation segment may leave the first vehicle in an area of high demand, at least partially remedying the vehicle location misalignment.

In certain implementations, however, the block 708 may be optional. For example, where the transportation segment to which the first modality is assigned occurs too far in the future (e.g., 10 minutes in the future, 30 minutes in the future), it may not be practicable to assign specific vehicles to transportation segments when initially generating the transportation proposal. Accordingly, for such transportation segments, the method 700 may stop processing after assigning the first modality to the transportation segment at block 706.

Figure 8:
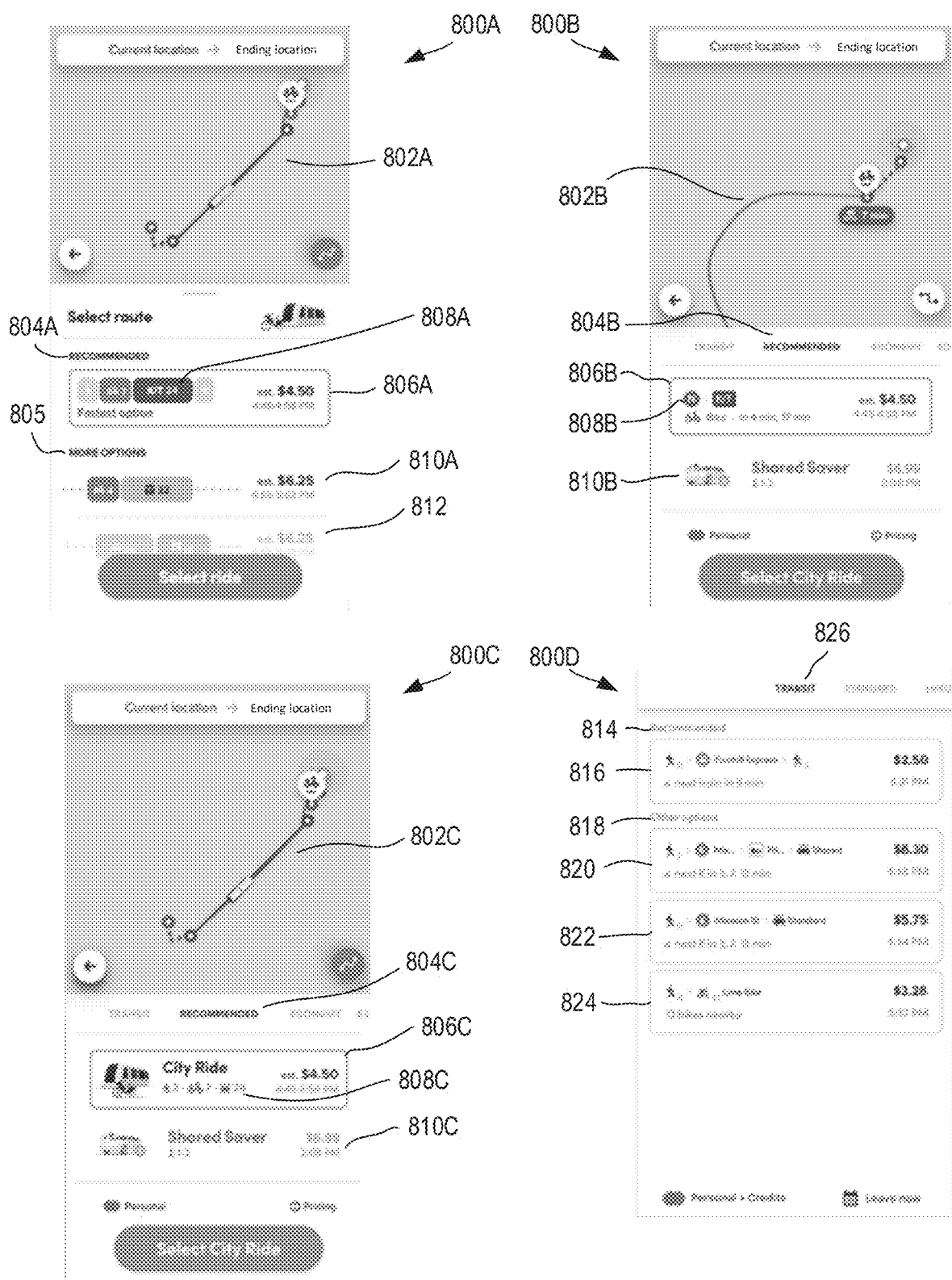
FIG. 8 illustrates user interfaces according to exemplary embodiments of the present disclosure.

FIG. 8 illustrates user interfaces 800A-D according to exemplary embodiments of the present disclosure. The user interfaces 800A-D may be implemented by a mobile device and/or a user device to display one or more transportation proposals received by the mobile device and/or user devices (e.g., transportation proposals from a current location to an ending location). For example, the user interfaces 800A-D may be used to at least partially implement block 610 of the method 600. User interfaces 800A-C include maps 802A-C that depict at least a part of a transportation route between two locations (e.g., an origin location and a destination location). For example, the maps 802A-C may depict a transportation route corresponding to a selected transportation proposal (e.g., the transportation proposal 806A-C). After receiving one or more transportation proposals, the user device may split the transportation proposals into one or more groups. For example, the user interface 800A depicts multiple transportation proposals 806A, 810A, 812. These proposals are separated into two groups: recommended proposals 804A and alternative options 805. The user interface 800A splits these groups into a vertical list, but other implementations may also be utilized. For example, the user interfaces 800B-C separate transportation proposals 806B-C, 810B-C into groups 804B-C selected above the transportation proposals 806B-C, 810B-C. In either instance, further transportation proposals may be viewable by scrolling down using the user interfaces 800A-C. For example, the user interface 800 D depicts multiple transportation proposals 816, 820, 822, 824. These transportation proposals 816, 820, 822, 824 are organized into further categories 814, 818 similar to the categories 804A, 805 of the user interface 800A. The transportation proposals 816, 820, 822, 824 may be viewable by scrolling down from a main screen, such as one of the interfaces depicted by user interfaces 800A-C. The user interface 800 D further includes additional categories 826 selectable at the top of the interface.

Displaying the transportation proposals 806A-C, 810A-C, 812, 816, 820, 822, 824 may cause the mobile device to display one or more of the modalities included within the transportation proposal. For example, for depicted proposals, the mobile device may depict a visual indication of the modalities included in the proposal (e.g., a textual, pictorial depiction). The mobile device may also depict further details regarding the modalities, such as a time spent using each modality, a distance covered by each modality, and/or a vehicle (e.g., a train or bus line) used in connection with each modality. For example, the user interfaces 800A-C depict indicators 808A-C for the transportation proposals 806A-C. The indicators 808A-C take different forms. For example, the indicators 808A include pictorial and textual representations of the included modalities and the time spent with each modality. In particular, the indicators 808A depicts a bicycle pictorial along with the number "7", indicating that the transportation proposal 806 a includes a bike modality that is expected to last seven minutes. The indicators 808A also depict a vehicle identifier "K/T" identifying the K/T train line along with the number "24", indicating that the transportation proposal 806 a includes a train modality that is expected to last 24 minutes. The indicators 808A also includes two walking pictorials, indicating that the transportation proposal 806A includes two walking modalities. As depicted, the pictorials are arranged in the order they will occur in the transportation proposal. The user interface 800B similarly includes textual identifiers of the "N" and "K/T" train lines, along with a visual bike identifier beneath the textual identifiers of the train lines. The indicators 808C of the user interface 800 C include walking, biking, and train pictorials beneath a summary title of the transportation proposal 806 C. Further, in addition to pictorial identifiers of the modalities, the depicted transportation proposals 816, 820, 822, 824 of the user interface 800D include more complete textual identifiers of certain modalities (e.g., modalities other than walking modalities). The additional information may include complete train line names, transit stop identifiers, and/or may identify a type of automobile transportation received (e.g., shared transportation with other users and/or standard transportation not associated with other users requesting transportation). In certain implementations, the indicators 808A-C may be selectable. For instance, the indicators 808A-C may be selectable to enable a user to change one of the modalities for the transportation proposal 806A-C. In such instances, when a user selects an indicator 808A-C, a menu (e.g., a drop-down or other selectable menu) may appear, enabling the user to select between alternative modalities for use with a particular segment (e.g., based on other transportation proposals or segments identified or generated in response to a received transportation request. In one example, a user may select an indicator 808A-C corresponding to a scooter modality and select, via the menu, to replace the scooter modality with a bike modality for the segment. In another example, a user may select an indicator corresponding to a train modality and may select, via the menu, to replace the train modality with an automobile modality. In still further examples, the user may select an indicator 808A-C corresponding to a modality to remove the modality from the transportation proposal 806A-C. For example, the user may select an indicator corresponding to a scooter modality that is followed by an automobile modality in the transportation proposal 806A-C and may, via the menu, remove the scooter modality from the transportation proposal 806A-C. In such examples, the other modalities of the transportation proposal 806A-C may be adjusted to compensate for the removed modality (e.g., the automobile modality may be lengthened to replace the scooter modality).

In each instance, the user interfaces 800A-D depict the modalities of the transportation proposals 806A-C, 810A-C, 812, 816, 820, 822, 824 in a compact and concise manner without unduly restricting the amount of visible information. Such a system for display can enable greater selection and visibility of potential transportation proposal options by reducing the total screen space required to display each transportation proposal. Further, such compact and concise depictions may allow a user to more quickly review and evaluate the potential transportation options, including transportation proposals that utilize different types of transportation.

Figure 9:
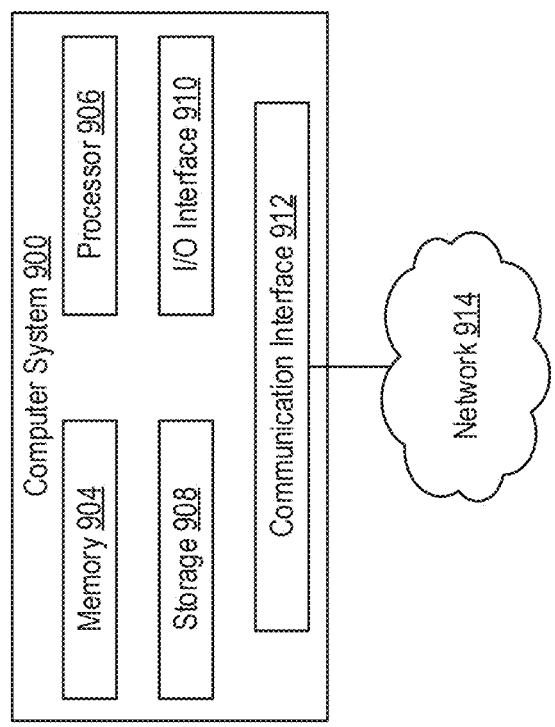
FIG. 9 illustrates a computer system according to an exemplary embodiment of the present disclosure.

FIG. 9 depicts an example computer system 900 that may be revised to implement one or more of the devices and/or components of FIG. 1A and/or FIG. 2, such as the transportation matching system 102, the server 202, the user device 250, the user database 260, and/or the vehicle database 266. In particular embodiments, one or more computer systems 900 perform one or more steps of one or more methods described or illustrated herein. In particular embodiments, one or more computer systems 900 provide the functionalities described or illustrated herein. In particular embodiments, software running on one or more computer systems 900 performs one or more steps of one or more methods described or illustrated herein or provides the functionalities described or illustrated herein. Particular embodiments include one or more portions of one or more computer systems 900. Herein, a reference to a computer system may encompass a computing device, and vice versa, where appropriate. Moreover, a reference to a computer system may encompass one or more computer systems, where appropriate.

This disclosure contemplates any suitable number of computer systems 900. This disclosure contemplates the computer system 900 taking any suitable physical form. As example and not by way of limitation, the computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 906, memory 904, storage 908, an input/output (I/O) interface 910, and a communication interface 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 906 includes hardware for executing instructions, such as those making up a computer program. As an example and not by way of limitation, to execute instructions, processor 906 may retrieve (or fetch) the instructions from an internal register, an internal cache, memory 904, or storage 908; decode and execute the instructions; and then write one or more results to an internal register, internal cache, memory 904, or storage 908. In particular embodiments, processor 906 may include one or more internal caches for data, instructions, or addresses. This disclosure contemplates processor 906 including any suitable number of any suitable internal caches, where appropriate. As an example and not by way of limitation, processor 906 may include one or more instruction caches, one or more data caches, and one or more translation lookaside buffers (TLBs). Instructions in the instruction caches may be copies of instructions in memory 904 or storage 908, and the instruction caches may speed up retrieval of those instructions by processor 906. Data in the data caches may be copies of data in memory 904 or storage 908 that are to be operated on by computer instructions; the results of previous instructions executed by processor 906 that are accessible to subsequent instructions or for writing to memory 904 or storage 908; or any other suitable data. The data caches may speed up read or write operations by processor 906. The TLBs may speed up virtual-address translation for processor 906. In particular embodiments, processor 906 may include one or more internal registers for data, instructions, or addresses. This disclosure contemplates processor 906 including any suitable number of any suitable internal registers, where appropriate. Where appropriate, processor 906 may include one or more arithmetic logic units (ALUs), be a multi-core processor, or include one or more processors 906. Although this disclosure describes and illustrates a particular processor, this disclosure contemplates any suitable processor.

In particular embodiments, memory 904 includes main memory for storing instructions for processor 906 to execute or data for processor 906 to operate on. As an example, and not by way of limitation, computer system 900 may load instructions from storage 908 or another source (such as another computer system 900) to memory 904. The processor 906 may then load the instructions from memory 904 to an internal register or internal cache. To execute the instructions, the processor 906 may retrieve the instructions from the internal register or internal cache and decode them. During or after execution of the instructions, the processor 906 may write one or more results (which may be intermediate or final results) to the internal register or internal cache. The processor 906 may then write one or more of those results to the memory 904. In particular embodiments, the processor 906 executes only instructions in one or more internal registers or internal caches or in memory 904 (as opposed to storage 908 or elsewhere) and operates only on data in one or more internal registers or internal caches or in memory 904 (as opposed to storage 908 or elsewhere). One or more memory buses (which may each include an address bus and a data bus) may couple the processor 906 to the memory 904. The bus may include one or more memory buses, as described in further detail below. In particular embodiments, one or more memory management units (MMUs) reside between the processor 906 and memory 904 and facilitate accesses to the memory 904 requested by the processor 906. In particular embodiments, the memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, the storage 908 includes mass storage for data or instructions. As an example and not by way of limitation, the storage 908 may include a hard disk drive (HDD), a floppy disk drive, flash memory, an optical disc, a magneto-optical disc, magnetic tape, or a Universal Serial Bus (USB) drive or a combination of two or more of these. The storage 908 may include removable or non-removable (or fixed) media, where appropriate. The storage 908 may be internal or external to computer system 900, where appropriate. In particular embodiments, the storage 908 is non-volatile, solid-state memory. In particular embodiments, the storage 908 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 908 taking any suitable physical form. The storage 908 may include one or more storage control units facilitating communication between processor 906 and storage 908, where appropriate. Where appropriate, the storage 908 may include one or more storages 908. Although this disclosure describes and illustrates particular storage, this disclosure contemplates any suitable storage.

In particular embodiments, the I/O Interface 910 includes hardware, software, or both, providing one or more interfaces for communication between computer system 900 and one or more I/O devices. The computer system 900 may include one or more of these I/O devices, where appropriate. One or more of these I/O devices may enable communication between a person and computer system 900. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O interface 910 may include one or more device or software drivers enabling processor 906 to drive one or more of these I/O devices. The I/O interface 910 may include one or more I/O interfaces 910, where appropriate. Although this disclosure describes and illustrates a particular I/O interface, this disclosure contemplates any suitable I/O interface or combination of I/O interfaces.

In particular embodiments, communication interface 912 includes hardware, software, or both providing one or more interfaces for communication (such as, for example, packet-based communication) between computer system 900 and one or more other computer systems 900 or one or more networks 914. As an example and not by way of limitation, communication interface 912 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 914 and any suitable communication interface 912 for the network 914. As an example and not by way of limitation, the network 914 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 900 may include any suitable communication interface 912 for any of these networks, where appropriate. Communication interface 912 may include one or more communication interfaces 912, where appropriate. Although this disclosure describes and illustrates a particular communication interface, this disclosure contemplates any suitable communication interface.

The computer system 900 may also include a bus. The bus may include hardware, software, or both and may communicatively couple the components of the computer system 900 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

The invention claimed is:

1. A computer-implemented method comprising:
    determining, utilizing one or more server devices, a future request location for expected future requests from requestor mobile devices for a first modality of a plurality of modalities;
    comparing, utilizing the one or more server devices, locations of provider devices associated with the first modality to the future request location to determine a device modality misalignment for the first modality;
    receiving, via the one or more server devices from a requestor mobile device, a request; and
    based on the device modality misalignment for the first modality:
        selecting, via the one or more server devices, a first provider device associated with the first modality, from a pool of provider devices associated with the plurality of modalities, based on comparing a location of the first provider device with the future request location;
        assigning the first provider device to a transportation segment for the request from the requestor mobile device; and
        providing, for display via a user interface of the requestor mobile device, the transportation segment and an indicator for the first provider device.

2. The computer-implemented method of claim 1, wherein:
    determining, utilizing the one or more server devices, the future request location for expected future requests from requestor mobile devices for the first modality comprises determining, utilizing the one or more server devices, a future high request location for the first modality of the plurality of modalities; and
    selecting, via the one or more server devices, the first provider device associated with the first modality comprises selecting the first provider device based on determining that the location of the first provider device differs from the future high request location.

3. The computer-implemented method of claim 1, further comprising:
    determining, utilizing the one or more server devices, a low request location for the first modality of the plurality of modalities; and
    selecting the first provider device based on determining that the location of the first provider device corresponds to the low request location.

4. The computer-implemented method of claim 1, wherein:
    comparing the locations of provider devices associated with the first modality to the future request location to determine the device modality misalignment for the first modality comprises determining, utilizing the one or more server devices, a surplus device location for the first modality of the plurality of modalities; and
    selecting the first provider device comprises selecting the first provider device based on determining that the location of the first provider device corresponds to the surplus device location.

5. The computer-implemented method of claim 1, further comprising determining, utilizing the one or more server devices, an additional future request location for future requests from requestor mobile devices for a second modality of a plurality of modalities.

6. The computer-implemented method of claim 5, further comprising comparing, utilizing the one or more server devices, locations of provider devices associated with the second modality to the additional future request location to determine an additional device modality misalignment for the second modality.

7. The computer-implemented method of claim 6, further comprising selecting, via the one or more server devices, the first provider device associated with the first modality based on the device modality misalignment for the first modality and the additional device modality misalignment for the second modality.

8. A non-transitory computer readable medium storing comprising instructions, that when executed by at least one processor, cause the at least one processor to:
    determine a future request location for expected future requests from requestor mobile devices for a first modality of a plurality of modalities;
    compare locations of provider devices associated with the first modality to the future request location to determine a device modality misalignment for the first modality;
    receive, from a requestor mobile device, a request; and
    based on the device modality misalignment for the first modality:
        selecting a first provider device associated with the first modality, from a pool of provider devices associated with the plurality of modalities, based on comparing a location of the first provider device with the future request location; and
        assigning the first provider device to a transportation segment for the request from the requestor mobile device; and
        providing, for display via a user interface of the requestor mobile device, the transportation segment and an indicator for the first provider device.

9. The non-transitory computer readable medium of claim 8, further comprising instructions, that when executed by at least one processor, cause the at least one processor to:
    determine the future request location for expected future requests from requestor mobile devices for the first modality by determining a future high request location for the first modality of the plurality of modalities; and
    select the first provider device associated with the first modality based on determining that the location of the first provider device differs from the future high request location.

10. The non-transitory computer readable medium of claim 8, further comprising instructions, that when executed by at least one processor, cause the at least one processor to:

determine a low request location for the first modality of the plurality of modalities; and
select the first provider device based on determining that the location of the first provider device corresponds to the low request location.

11. The non-transitory computer readable medium of claim 8, further comprising instructions, that when executed by at least one processor, cause the at least one processor to:
compare the locations of provider devices associated with the first modality to the future request location to determine the device modality misalignment for the first modality by determining a surplus device location for the first modality of the plurality of modalities; and
select the first provider device based on determining that the location of the first provider device corresponds to the surplus device location.

12. The non-transitory computer readable medium of claim 8, further comprising instructions, that when executed by at least one processor, cause the at least one processor to determine an additional future request location for future requests from requestor mobile devices for a second modality of a plurality of modalities.

13. The non-transitory computer readable medium of claim 12, further comprising instructions, that when executed by at least one processor, cause the at least one processor to compare locations of provider devices associated with the second modality to the additional future request location to determine an additional device modality misalignment for the second modality.

14. The non-transitory computer readable medium of claim 13, further comprising instructions, that when executed by at least one processor, cause the at least one processor to select the first provider device associated with the first modality based on the device modality misalignment for the first modality and the additional device modality misalignment for the second modality.

15. A system comprising:
at least one processor; and
a non-transitory computer readable medium comprising instructions that, when executed by the at least one processor, cause the system to:
determine a future request location for expected future requests from requestor mobile devices for a first modality of a plurality of modalities;
compare locations of provider devices associated with the first modality to the future request location to determine a device modality misalignment for the first modality;
receive, from a requestor mobile device, a request;
based on the device modality misalignment for the first modality:
selecting a first provider device associated with the first modality, from a pool of provider devices associated with the plurality of modalities, based on comparing a location of the first provider device with the future request location;
assigning the first provider device to a transportation segment for the request from the requestor mobile device; and
providing, for display via a user interface of the requestor mobile device, the transportation segment and an indicator for the first provider device to the requestor mobile device.

16. The system of claim 15, further comprising instructions that, when executed by the at least one processor, cause the system to:
determine the future request location for expected future requests from requestor mobile devices for the first modality by determining a future high request location for the first modality of the plurality of modalities; and
select the first provider device associated with the first modality based on determining that the location of the first provider device differs from the future high request location.

17. The system of claim 15, further comprising instructions that, when executed by the at least one processor, cause the system to:
determine a low request location for the first modality of the plurality of modalities; and
select the first provider device based on determining that the location of the first provider device corresponds to the low request location.

18. The system of claim 15, further comprising instructions that, when executed by the at least one processor, cause the system to:
compare the locations of provider devices associated with the first modality to the future request location to determine the device modality misalignment for the first modality by determining a surplus device location for the first modality of the plurality of modalities; and
select the first provider device based on determining that the location of the first provider device corresponds to the surplus device location.

19. The system of claim 15, further comprising instructions that, when executed by the at least one processor, cause the system to:
determine an additional future request location for future requests from requestor mobile devices for a second modality of a plurality of modalities; and
compare locations of provider devices associated with the second modality to the additional future request location to determine an additional device modality misalignment for the second modality.

20. The system of claim 19, further comprising instructions that, when executed by the at least one processor, cause the system to select the first provider device associated with the first modality based on the device modality misalignment for the first modality and the additional device modality misalignment for the second modality.

* * * * *